(12) United States Patent
Langholz

(10) Patent No.: US 10,999,229 B2
(45) Date of Patent: May 4, 2021

(54) PROVIDING MESSAGE STATUS NOTIFICATIONS DURING ELECTRONIC MESSAGING

(71) Applicant: Facebook, Inc., Menlo Park, CA (US)

(72) Inventor: Benjamin S Langholz, San Francisco, CA (US)

(73) Assignee: FACEBOOK, INC., Menlo Park, CA (US)

(*) Notice: Subject to any disclaimer, the term of this patent is extended or adjusted under 35 U.S.C. 154(b) by 0 days.

(21) Appl. No.: 16/518,906

(22) Filed: Jul. 22, 2019

(65) Prior Publication Data

US 2019/0342247 A1    Nov. 7, 2019

Related U.S. Application Data

(63) Continuation of application No. 15/665,328, filed on Jul. 31, 2017, now Pat. No. 10,397,156, which is a continuation of application No. 14/222,422, filed on Mar. 21, 2014, now Pat. No. 9,722,962.

(51) Int. Cl.
| | |
|---|---|
| G06F 17/21 | (2006.01) |
| H04L 12/58 | (2006.01) |
| G06F 3/0481 | (2013.01) |
| G06F 17/24 | (2006.01) |

(52) U.S. Cl.
CPC .......... H04L 51/16 (2013.01); G06F 3/04817 (2013.01)

(58) Field of Classification Search
CPC ..... H04L 51/16; G06F 3/04817; G06F 3/0481
See application file for complete search history.

(56) References Cited

U.S. PATENT DOCUMENTS

| | | | | |
|---|---|---|---|---|
| 5,880,731 A | * | 3/1999 | Liles | G06F 3/0481 345/473 |
| 7,752,553 B2 | * | 7/2010 | Pennington | G06Q 10/10 715/751 |
| 8,032,470 B1 | * | 10/2011 | Heidenreich | G06N 5/04 706/45 |
| 8,538,895 B2 | * | 9/2013 | Appelman | G06Q 10/10 705/319 |
| 9,722,962 B2 | | 8/2017 | Langholz | |
| 2001/0048449 A1 | * | 12/2001 | Baker | H04L 67/306 715/758 |
| 2002/0130904 A1 | * | 9/2002 | Becker | H04L 51/04 715/753 |
| 2006/0031772 A1 | * | 2/2006 | Valeski | H04L 51/04 715/751 |

(Continued)

OTHER PUBLICATIONS

U.S. Appl. No. 14/222,422, Apr. 8, 2016, Office Action.

(Continued)

*Primary Examiner* — Nicholas Augustine
(74) *Attorney, Agent, or Firm* — Keller Jolley Preece

(57) ABSTRACT

One or more embodiments described herein include methods and systems of providing message status notifications. The status notifications can comprise one or more of sent, delivered, or accessed/read notifications. In one or more embodiments a status notification is persistently displayed in a thread for each participant in a conversation. Each time the participant accesses a new message, the system can move the status notification adjacent to the new message.

20 Claims, 19 Drawing Sheets

(56) References Cited

U.S. PATENT DOCUMENTS

| | | | | |
|---|---|---|---|---|
| 2007/0143417 A1* | 6/2007 | Daigle | ............... | G06Q 10/107 |
| | | | | 709/206 |
| 2008/0140523 A1* | 6/2008 | Mahoney | ........... | G06Q 30/0256 |
| | | | | 705/14.54 |
| 2008/0201638 A1* | 8/2008 | Nair | .................... | H04W 4/029 |
| | | | | 715/706 |
| 2008/0209339 A1* | 8/2008 | Macadaan | ............ | G06F 16/252 |
| | | | | 715/745 |
| 2008/0209351 A1* | 8/2008 | Macadaan | ............ | G06F 16/951 |
| | | | | 715/762 |
| 2009/0063995 A1* | 3/2009 | Baron | ............. | H04N 21/25866 |
| | | | | 715/753 |
| 2010/0205541 A1* | 8/2010 | Rapaport | ............. | G06F 16/285 |
| | | | | 715/753 |
| 2011/0271205 A1* | 11/2011 | Jones | ................... | H04N 7/157 |
| | | | | 715/753 |
| 2014/0245178 A1* | 8/2014 | Smith | ................... | H04L 51/16 |
| | | | | 715/753 |
| 2017/0353417 A1 | 12/2017 | Langholz | | |

OTHER PUBLICATIONS

U.S. Appl. No. 14/222,422, Oct. 21, 2016, Office Action.
U.S. Appl. No. 14/222,422, Mar. 28, 2017, Notice of Allowance.
U.S. Appl. No. 15/665,328, Apr. 9, 2019, Notice of Allowance.

* cited by examiner

PROVIDING MESSAGE STATUS NOTIFICATIONS DURING ELECTRONIC MESSAGING

CROSS-REFERENCE TO RELATED APPLICATIONS

The present application is a continuation of U.S. application Ser. No. 15/665,328 filed Jul. 31, 2017 which is a continuation of U.S. application Ser. No. 14/222,422, filed Mar. 21, 2014 which issued as U.S. Pat. No. 9,722,962. The aforementioned application is hereby incorporated by reference in its entirety.

BACKGROUND

1. Technical Field

One or more embodiments relate generally to electronic messaging systems and methods. More specifically, one or more embodiments relate to systems and methods for providing status notifications during electronic messaging.

2. Background and Relevant Art

Messaging applications allow users to send and receive messages. Unfortunately, conventional application user interfaces make it difficult for a user to perceive who is actively participating in a messaging session. For example, once a message has been sent, the sender typically does not know if, or when, the intended recipient has seen the message. This may be because, for example, the intended recipient is not near a computing device, does not have the messaging application open, or has spotty network access. During a group communication session, these disadvantages are typically compounded due to the increased number of participants.

Some conventional messaging applications provide delivery and read receipts. For example, some messaging applications provide one or more checkmarks next a message to indicate whether the message has been delivered or read. More specifically, some applications display a first checkmark next to a message when the message is delivered and a second checkmark next to the message when the message is read. Other conventional messaging applications display a single checkmark next to the most recently read message. Additionally, some messaging applications include under the most recent message the name of any participants who have read the message.

While these improvements provide users with some context on whether a message has been received or seen, conventional messaging applications still have various drawbacks in relation to read and delivery receipts. For example, conventional messaging applications typically only provide read receipts for the latest message in a thread. Thus, a user may not be able to tell which less recent messages have been accessed. This is particularly true in the context of group conversations with multiple participants.

Furthermore, conventional messaging applications typically only provide a user with read receipts for messages sent by the user. In other words, conventional messaging applications typically fail to provide delivery or read receipts for messages sent by other users. As such, a user may not be able to decipher which messages sent by other group members have been read.

In addition to the foregoing, check marks and participant names can quickly clutter the graphical user interface (GUI) of the messaging application. The clutter is typically exacerbated in group messaging sessions that include more than a few participants. The clutter caused by conventional delivery/read receipts is also magnified when the GUI is presented on a hand-held or other device with a limited display size.

Accordingly, there are a number of disadvantages with conventional electronic messaging applications and systems.

SUMMARY

Some embodiments provide benefits and/or solve one or more of the foregoing or other problems in the art with methods and systems for providing status notifications during electronic messaging sessions. For example, methods and systems described herein notify a user of communications seen by recipients. In a group communication session, the methods and systems described herein can provide the user with a plurality of notifications indicating which messages each participant in the group has read or otherwise accessed.

Additionally, one or more methods and systems described herein provide sent and delivered notifications. For example, a first notification can notify a user as messages are sent from a communication device associated with the user. Along similar lines, a second notification can indicate to a user that a message has been delivered to a communication device associated with an intended recipient of the message.

In addition to the foregoing, one or more embodiments can provide the foregoing or other benefits without cluttering a GUI of the messaging application. In particular, one or more embodiments can provide notifications indicating that a message has been sent or delivered without the use of icons. Still further, one or more embodiments can provide notifications that indicate which users have seen which messages without including names of users or other lengthy notifications.

Additional features and advantages of the embodiments will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. In the following drawings, bracketed text and blocks with dashed borders (e.g., large dashes, small dashes, dot-dash, dots) are used herein to illustrate optional features or operations that add additional features to embodiments of the invention. Such notation, however, should not be taken to mean that these are the only options or optional operations, and/or that blocks with solid borders are not optional in certain embodiments of the invention. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The embodiments provide messaging methods and systems that provide message status notifications to a user. For example, a messaging application can provide notifications to a user on when messages are sent, delivered, and/or read by other participants. In particular, the messaging application can provide notification in a messaging GUI to indicate the status of messages in a communication thread.

In one or more embodiments, a messaging application provides a notification element representing the recipient of a message. The messaging application can position the notification element within a messaging GUI next to the message most recently accessed by the recipient. As the intended recipient accesses additional messages in the communication thread, the messaging application can move the notification element down the communication thread such that the notification element remains adjacent to the message most recently accessed by the recipient. As such, the messaging application can allow a user to readily identify which messages a recipient has, or has not, accessed based on the position of the notification element in the communication thread. Furthermore, the notification element can indicate to the user which message the recipient viewed last regardless of whether it is the most recent message in the communication thread or an older message.

Similarly, in a group electronic messaging conversation, the messaging application can provide a notification element for each participant. The notification elements can indicate the messages most recently accessed by each participant in the group electronic messaging conversation. As new messages are added to the conversation, the messaging application can move a given participant's notification element as the given participant accesses additional messages.

The messaging application can also notify a user as messages are successfully sent from a communication device associated with the user. In particular, the messaging application can provide a sent notification in the messaging GUI each time a message is successfully sent. In one or more embodiments, the sent notification can avoid or reduce GUI clutter. For example, the sent notification can comprise a change in a characteristic or attribute of the display of the message within the GUI.

Along similar lines, the messaging application can notify a sender of a message when the message is successfully received at a communication device associated with an intended recipient. In particular, the messaging application can provide a received notification in the messaging GUI each time a message is successfully received. In one or more embodiments, the received notification can avoid or reduce GUI clutter. For example, the received notification can comprise an additional change in a characteristic or attribute of the display of the message within the GUI.

Figure 1:
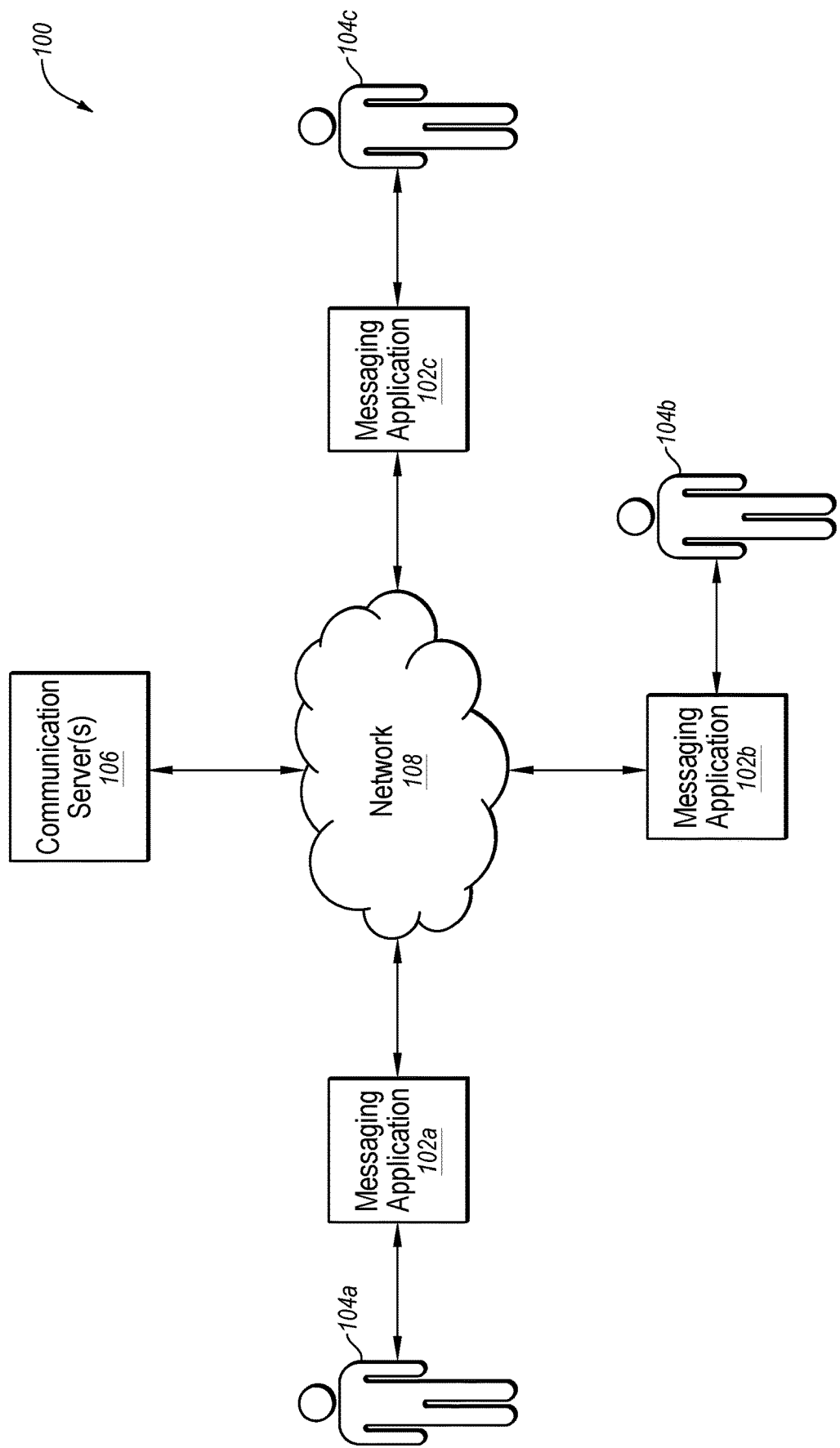
FIG. 1 illustrates a schematic diagram of a messaging system in accordance with one or more embodiments.

Referring now to the figures, FIG. 1 is a schematic diagram illustrating an exemplary messaging system 100 in accordance with an embodiment of the present invention. The messaging system 100 can provide the infrastructure that allows a messaging application to provide message status notifications to a user. An overview of the messaging system 100 will be described next in relation to FIG. 1. Thereafter, a more detailed description of the components and processes of the messaging system will be described in relation to FIG. 2.

As illustrated by FIG. 1, the messaging system 100 can include a plurality of messaging applications 102a, 102b, 102c. Each messaging application can allow an associated user 104a, 104b, 104c to electronically send and receive messages. As used herein, the term "message" or "electronic message" refers to a communication that a messaging application can both send and receive. Messages can include text messages, photos, stickers or other icons, videos, voice recordings, music, voice mails, etc. In particular, each messaging application 102a, 102b, 102c can communicate with one or more communication servers 106 via one or more networks 108. The network 108 can comprise any of the networks describe below in relation to FIGS. 8 and 9.

The embodiment illustrated in FIG. 1 includes users 104a, 104b, 104c accessing a messaging application 102a, 102b, 102c. The messaging applications 102a, 102b, 102c can comprise a network application, such as a web application or a native application. The messaging applications 102a, 102b, 102c can provide messaging GUIs that allow the users 104a, 104b, 104c to compose and read messages as described in greater detail below.

FIG. 1 shows the communication server 106 and each of the messaging applications 102a, 102b, 102c communicatively coupled via network 108. One will appreciate in light of the disclosure here that the invention is not so limited. For example, the communication server 106 and/or each of the messaging applications 102a, 102b, 102c can communicate with one another in any other suitable manner, such as via a peer-to-peer protocol that bypasses network 108.

Figure 2:
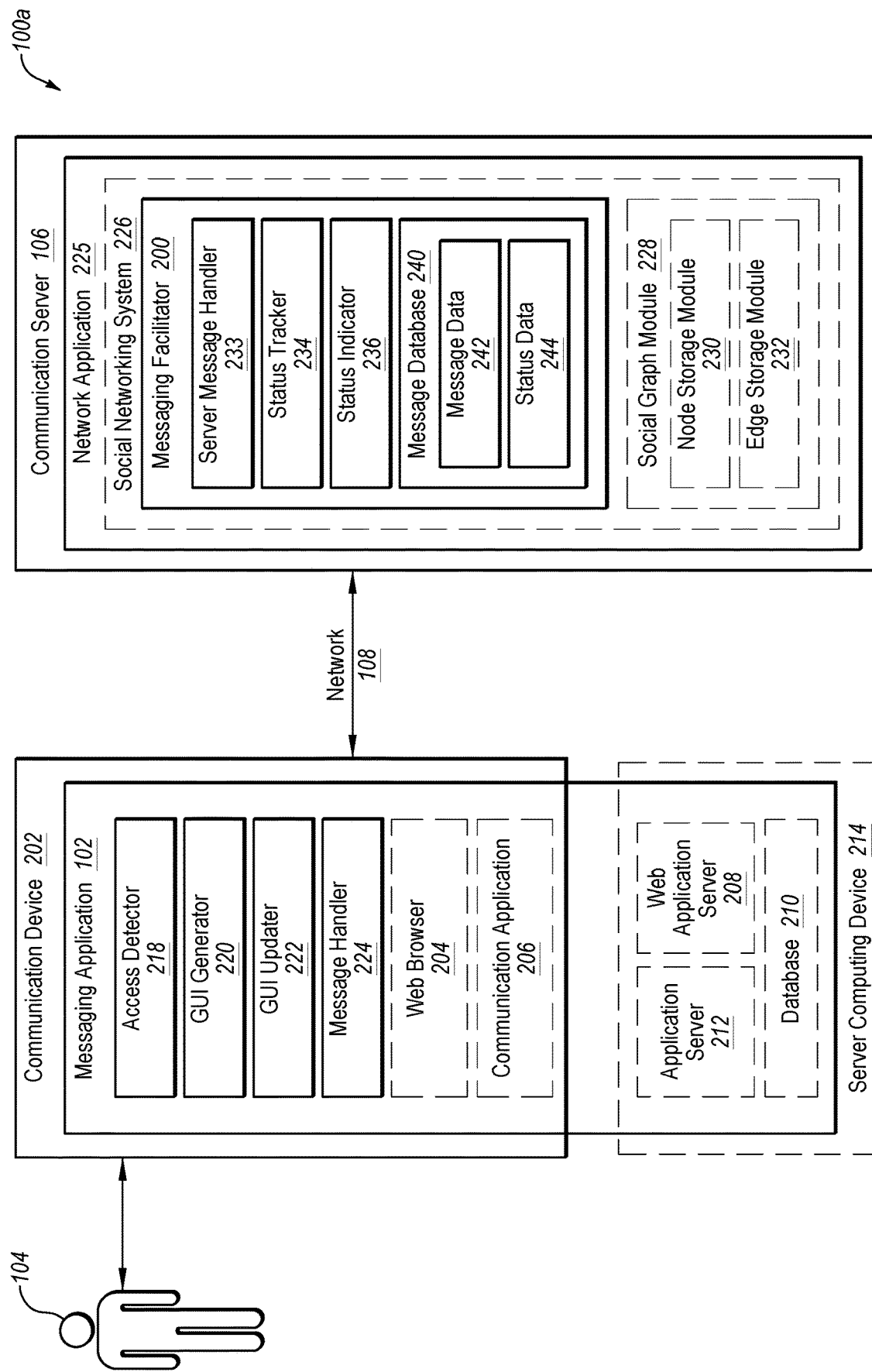
FIG. 2 illustrates a detailed schematic diagram of the components of the system of FIG. 1 in accordance with one or more embodiments.

FIG. 2 illustrates a schematic diagram illustrating a messaging system 100a in accordance with an embodiment of the present invention. The messaging system 100a is one example embodiment of a messaging system 100 described above in relation to FIG. 1. As shown, the messaging system 100a can include a messaging application 102 and a messaging facilitator 200. The user 104 can use a computing device 202 to access the messaging application 102. The computing device 202 can comprise any of the computing devices described below in relation to FIG. 8. In embodiments where the messaging application 102 is a web application, the user 104 may interface with the messaging application 102 using a web browser 204 application or a communication application 206 (also referred to as a special-purpose client application later herein), and thus these applications may or may not be considered as part of the messaging application 102.

In such embodiments where the messaging application 102 is a web application, the backend of the messaging application 102 (i.e., the set of applications providing data and logic for the messaging application 102) may include a web application server 208 (including but not limited to the Apache HTTP Server by the Apache Software Foundation, Internet Information Services (IIS) by Microsoft Corporation, nginx by NGINX, Inc., the open-source lighttpd web server, and Google Web Server (GWS) by Google Inc.) and optionally a relational or non-relational database 210 (including but not limited to MySQL by Oracle Corporation, PostgreSQL by the PostgreSQL Global Development Group, Apache Cassandra by the Apache Software Foundation, HBase by the Apache Software Foundation, another NoSQL database, and MongoDB by 10gen).

In embodiments where the messaging application 102 is a native application, the messaging application 102 can utilize the communication application 206. The communication application 206 in turn may utilize an application server 212 (e.g., a Java application server) and/or database 210 of a separate server computing device 214. Applications that use a server computing device 214 can be deemed a network application. Applications that do not utilize the application server 212 or database 210 can be deemed a "standalone" application. Accordingly, depending upon the context of the term "application," this term may refer to software executing on the user's computing device 202 and/or the server computing device 214. In particular, at least a first portion of the messaging application software can execute on the user's computing device 202 and at least a second portion of the messaging application software can execute on the set of one or more server computing devices 214.

The messaging application 102 may also comprise an access detector 218, a GUI generator 220, a GUI updater 222, and a message handler 224. Each of the components 218-224 of the communication application 102 can be in communication with one another using any suitable communication technologies. It will be recognized that although the components 218-224 of the communication application 102 are shown to be separate in FIG. 2, any of components 218-224 may be combined into fewer components, such as into a single component, or divided into more components as may serve a particular implementation. The components 218-224 can comprise software, hardware, or both. For example, the components 218-224 can comprise one or more instructions stored on a computer-readable storage medium and executable by processors of one or more computing devices. When executed by the one or more processors, the computer-executable instructions of the communication application 102 can cause the computing device 202 to perform the methods described herein. Alternatively, the components 218-224 can comprise hardware, such as a special purpose processing device to perform a certain function or group of functions. Additionally or alternatively, the components 218-224 can comprise a combination of computer-executable instructions and hardware.

The access detector 218 can determine when a message has been accessed via the messaging application 102. The access detector 218 can determine that a message has been accessed when the user 104 interacts with the messaging application 102 in a manner to indicate that the user 104 has seen the message. For example, the access detector 218 can determine that a message has been accessed when the user 104 opens a GUI or other interface containing the message, when the user 104 begins to compose a message in a thread containing the message, when the user accesses a notification indicating the receipt of the message, or when the user 104 otherwise accesses the message.

Upon detecting that the user 104 has accessed a message, the messaging application 102 can send an indication to the communication server 106. As explained below, such indications can allow the messaging facilitator 200 to alert or otherwise inform another messaging application (such as the messaging application that sent the message) that the user 104 has accessed the message. Receipt of an indication from the messaging facilitator 200 that a user has accessed a message can allow the messaging application 102 to provide, update, or modify a status notification associated with the user who accessed the message.

In addition to the access detector 218, the messaging application 102 also includes a GUI generator 220. The GUI generator 220 may display (e.g., by way of a display screen associated with the computing device 202) a GUI including an electronic messaging session. For example, the GUI may include a plurality of graphical objects that facilitate an electronic messaging session among a plurality of participants (i.e., the user 104 and one or more other participants). More particularly, the GUI generator 220 can direct the computing device 202 to display a group of graphical objects that enable viewing an electronic messaging thread as explained in greater detail below. The electronic messaging thread can include a plurality of messages sent and received among a plurality of participants in the electronic messaging session.

A GUI updater 222 of the messaging application 102 can update the display of an electronic messaging thread of the messaging application 102. In particular, the GUI updater 222 can provide or modify the display of a sent, delivered, and/or seen notification 102. In particular, upon receiving an indication that a message has been sent, delivered, and/or accessed the GUI updater can instruct the computing device 202 to display or update the display of a status notification. Additionally, the GUI updater 222 may also direct the computing device 202 to display a graphical object within a displayed electronic messaging thread indicating the date and/or time of access for each participant in the session.

The message handler 224 may direct the sending and receiving of messages to and from a communication server 106 over the course of an electronic messaging session among a plurality of participants. The message handler 224 may organize incoming and outgoing messages and direct the GUI generator 220 to display messages. Furthermore, the message handler 224 can detect when the computing device 202 successfully sends a message. Upon detecting that the computing device 202 has sent a message, the message handler 224 can send an indication or otherwise communicate to the GUI updater 222 that the message was sent to allow the GUI updater 222 to provide a sent notification.

The messaging application 102 can interact with a messaging facilitator 200 to send and receive messages and other communications. FIG. 2 illustrates a single messaging application 102 operating on a single computing device 202 interacting with a single communication server 106 with a single messaging facilitator 200. One of skill in the art will appreciate in light of the disclosure herein that the invention is not so limited. In alternative embodiments, the communication server 106 may interact with any number of communication devices 202 via the network 108.

The system 100a of the embodiment illustrated in FIG. 2 includes a communication server 106 that hosts a network application 225 including a messaging facilitator 200. In one or more embodiments of the invention, the network application 225 comprises a social-networking system 226. In other embodiment, the network application 225 may comprise another type of application, including but not limited to an e-mail application, an SMS application, a search engine application, an instant messaging application, or any number of other applications that provide for electronic messaging. In embodiments where the network application 225 comprises a social-networking system 226, the network application 225 may include a social graph module 228 for representing and analyzing a plurality of users and concepts. A node storage module 230 of the social graph module 228 can store node information comprising nodes for users, nodes for concepts, and nodes for items. An edge storage module 232 of the social graph module 228 can store edge information comprising relationships between nodes and/or actions occurring within the social-networking system 226. Further detail regarding social-networking systems, social graphs, edges, and nodes is presented below with respect to FIG. 9.

The messaging facilitator 200 of the network application 225 can comprise a server message handler 233, a status tracker 234, a status indicator 236, and a message database 240. Each of the components 234-240 of the messaging facilitator 200 can be in communication with one another using any suitable communication technologies. It will be recognized that although the components 234-240 of the messaging facilitator 200 are shown to be separate in FIG. 2, any of components 234-240 may be combined into fewer components, such as into a single component, or divided into more components as may serve a particular implementation. The components 234-240 can comprise software, hardware, or both. For example, the components 234-240 can comprise one or more instructions stored on a computer-readable storage medium and executable by processors of one or more computing devices. When executed by the one or more processors, the computer-executable instructions of the messaging facilitator 200 can cause the communication server 106 to perform the methods described herein. Alternatively, the components 234-240 can comprise hardware, such as a special purpose processing device to perform a certain function or group of functions. Additionally or alternatively, the components 234-240 can comprise a combination of computer-executable instructions and hardware.

The server message handler 233 can process messages received from communication applications 102. For example, the server message handler 233 may be configured to interact with a message handler 224 of a messaging application 102. The server message handler 233 can act as a director for messages sent back and forth among users in an electronic messaging conversation. The server message handler 233 may receive a message from messaging application 102, detect the intended recipient of the message, and send the message to the messaging application 102 associated with the intended recipient.

Additionally, the server message handler 233 can also re-format or otherwise modify the content or format of a message based on the messaging protocol used by a destination communication device 202 or a type. As such, in one or more embodiments of the present invention the messaging facilitator can allow participants using different communication platforms to exchange messages. For example, the server message handler 233 can receive a message in a first protocol (SMS, IM, XMPP, APNS, etc.), re-format the message into a second protocol, and send the reformatted message to the intended recipient(s).

The status tracker 234 can track the status of the messages being sent to and from the communication application(s) 102. For example the status tracker 234 can identify when a message is received from a communication application 102, is sent to a communication application 102, is accessed by a communication application 102, etc. For example, the status tracker 234 can receive indications from messaging applications 102 (i.e., an access detector 218) regarding the status of messages. In particular, the status tracker 234 can receive an indication (such as a push notification) from an access detector 218 that a user 104 has accessed a message. The status tracker 234 may also be configured to monitor the date and time of the sending, receiving, delivering, and/or accessing of messages.

The status indicator 236 can send indications (such as push notifications) to communication application 102 to notify the communication application 102 of the status of messages. As mentioned above, the communication application 102 can add, modify, or otherwise change or update status notifications based on indications received from the status indicator 236. For example, the status indicator 236 can send an indication to an access detector 218 of a communication application 102 indicating that another user has accessed a message in a messaging thread in which the user 104 of the communication application 102 is participating. Furthermore, the status indicator 236 can send indications to an access detector 218 that a message has been delivered to an intended receipt.

The messaging facilitator 200 may also include a message database 240. The message database 240 may be configured to maintain message data 242 representative of content of messages from electronic messaging sessions among a plurality of participants. The message database 240 may also be configured to maintain status data 244 representative of information related to when a message was sent, delivered, or accessed and by whom. The message database 240 can thus provide an archive of messaging threads, which the messaging facilitator 200 can provide to a user on demand or once a user logs into the communication application 102 using a new computing device.

Referring now to FIGS. 3A-5, various GUIs are illustrated showing aspects of one or more embodiments of the present invention. For example, FIGS. 3A-5 illustrate various view of GUIs that a messaging application 102 of one or more embodiments can provide to facilitate electronic messaging. In particular, FIGS. 3A-5 illustrate status notification that the messaging application 102 can provide to notify a user 104 of the status of messages in a messaging thread.

Figure 3A:
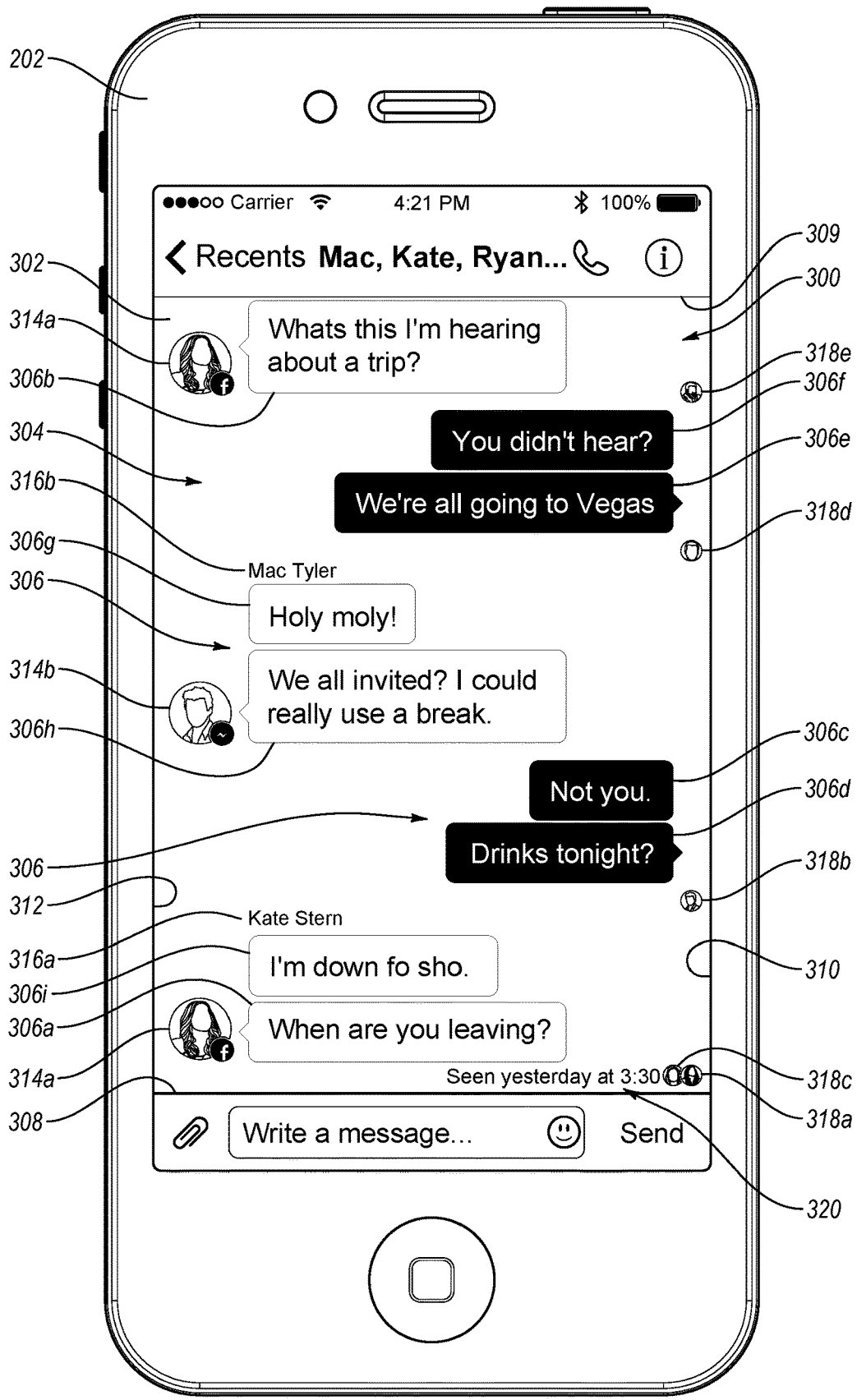
FIGS. 3A-3F illustrate various views of a user interface of a messaging application including status notifications in accordance with one or more embodiments.

FIG. 3A illustrates an example of a display of an electronic messaging graphical user interface 300 (or simply "user interface 300"). Upon a user 104 opening the messaging application 102 on the communication device 202 and selecting a conversation, the GUI generator 220 presents a user with the display illustrated in FIG. 3A. As shown, the user interface 300 includes a viewing area 302 displaying at least a portion of a communication thread 304. The communication thread 304 includes a plurality of messages 306 exchanged between the participants of a conversation. For longer communication threads a portion of the communication thread 304 can reside outside of a current viewing area 302 of the user interface 300. To access older messages 306, a user can scroll or otherwise manipulate the user interface 300 to pull down older portions of the communication thread 304.

In one or more embodiments, the user interface 300 can include messages 306 arranged chronologically. For example, the user interface 300 can display more recent messages near a bottom 308 of the viewing area 302 and less recent messages near a top 309 of the viewing area 302. In particular, FIG. 3A illustrates that the most recent message 306a is displayed at the bottom 308 while the oldest message 306b in the viewing area 302 is positioned near the top 309 of the communication thread 304. As new messages are received, the GUI updater 222 can position them at the bottom of the viewing area 302 and push the older messages beyond the top 309 of the viewing area 302.

In alternative embodiments, the user interface 300 can include more recent messages near the 309 and less recent messages near a bottom 308 of the viewing area 302. In still further embodiments, the user interface 300 can display the messages in a horizontal arrangement with less recent messages near one side and more recent message near an opposing side, or vice versa.

In one or more embodiments the user interface 300 displays messages 306 within the communication thread 304 in a manner that distinguishes messages from the sender (i.e., user of the computing device 202) and messages from the other participants in the conversation thread 304. In particular, the user interface 300 can give messages from the user a first appearance and messages from other participants a second, differing appearance. For example, as shown in the user interface 300, messages 306c, 306c, 306d, 306f sent from the user are a first color and are positioned proximate a first side 310 of the viewing area 302. On the other hand, messages 306a, 306b, 306g, 306h, 306i are a second color and are positioned proximate a second opposing side 312 of the viewing area 302. In alternative embodiments, the different messages can be distinguished using other visual effects, such as, but not limited to size, shape, position, color, etc.

In addition to the foregoing, the user interface 300 can include participant notification elements that associate particular messages with particular participants. For example, FIG. 3A illustrates that each message sent from a participant other than the user can include a participant notification element adjacent 314a, 314b adjacent messages 306a, 306b, 306g, 306j, 306i. In particular, the user interface 300 includes a first participant notification element 314a adjacent messages 306a, 306b, 306i sent from a first participant. Similarly, the user interface 300 includes a second participant notification element 314b adjacent both messages 306g, 306h sent from a second participant.

The participant notification element 314a, 314b can comprise a name of the associated participant, a picture of the associated participant, a picture or animation selected by the associated participant, an icon, a glyph, or any other indicator suitable for differentiating one participant from another. For example, FIG. 3A illustrates that the participant notification element 314a, 314b comprise social network profile pictures of the associated participants. As such, in at least one embodiment, each participant or user of the messaging application 102 can select their associated participant notification element. Additionally or alternatively, the graphical interface 300 can display the name or handle 316a, 316b of a give participant adjacent their messages.

In any event, the user interface 300 can use the placement, organization, orientation, and/or appearance to help the user understand the respective sources and relative ages of the messages 306 display in the user interface 300. Additionally, the user interface 300 can include access notification elements 318a-318e to indicate which messages 306 each participant has most recently accessed. In particular, the user interface 300 can include an access notification element 318a-318e for each participant in a given communication thread. The GUI updater 222 can ensure that the access notification element 318a-318e for a given participant adjacent the message 306 of the communication thread 304 most recently accessed by the given participant. Thus, the access notification elements 318a-318e can indicate to the user which participants have seen which messages in the communication thread.

For example, FIG. 3A illustrates that the user interface 300 includes a first access notification element 318a associated with the first participant. The GUI updater 222 can maintain the first access notification element 318a adjacent the message most recently accessed by the first participant. In the embodiment illustrated in FIG. 3A, the most recent message accessed by the first participant is message 306a. The GUI updater 222 can leave the first access notification element 318a adjacent the message 306a until the access detector 218 is notified that the first participant has accessed a more recent message.

Additionally, the GUI updater 222 can place the access notification elements adjacent the most recently accessed messages 306 regardless of the sender of the message 306. In other words, the access notification elements are not limited to providing access or read confirmations for messages sent by the user of the computing device 202. In particular, the access notification elements can provide access or read confirmations for any message accessed by a participant of the communication thread 304.

For example, the user interface 300 of FIG. 3A illustrates that the first access notification element 318a associated with the first participant is adjacent the most recent message 306a, which happens to be a message sent by the first participant. Thus, first access notification element 318a indicates that the message 306a sent by the first participant is the message most recently accessed by the first participant. Along related lines, the user interface 300 illustrates that the third access notification element 318c is also adjacent the message 306a. Thus, the third access notification element 318c indicates that neither the user nor the third participant, but rather another participant sent the message 306a most recently accessed by a third participant.

While both the first and third access notification elements are adjacent the most recent message 306a in the communication thread 304, the present invention is not limited to providing access or read confirmation of the most recent message in a communication thread. Indeed, the user interface 300 can indicate the last message 306 accessed by each participant whether or not the message is the most recent message in the communication thread 304. For example, FIG. 3A illustrates that the second, fourth and fifth access notification elements 318b, 318d, 318e are all adjacent messages 306d, 306e. 306b that are older (i.e., less recent) than the most recent message 306a in the communication thread 304. As such, the access notification elements can readily allow the user to determine the last message accessed by each participant in the communication thread 304.

In one or more embodiments the access notification elements are specific to a given participant. In other words, the access notification elements can provide an indication of the particular participant with which the given access notification element is associated. For example, as shown by FIG. 3A the access notification elements 318a, 318c can comprise a smaller version of the participant notification element 314a, 314c. In alternative embodiments the access notification elements can differ from the participant notification elements. In particular, the access notification elements can comprise a name or initials of the associated participant, a picture of the associated participant, a picture or animation selected by the associated participant, an icon, a glyph, or any other indicator suitable for differentiating one participant from another.

In addition to the access notification elements, the user interface 300 can further include additional status notifications regarding one or more messages. For example, the user interface 300 can include location tags that indicate a geographic location from where a given message was sent. The geographic location can comprise a country, a city, or a more granular location. Exemplary granular locations include addresses, places of interest, and other representations of geographic locations.

Additionally, the user interface 300 can include device tags that indicate a type of device from which a given message was sent. For example, the device tags can indicate whether a given message was sent from a mobile device or a traditional personal computer. Alternatively or additionally, the device tags can indicate a brand of device from which a given message was sent.

Still further, FIG. 3A illustrates that the user interface 300 can include a status information line 320. The status information line can include any of the additional status notifications discussed above. Furthermore, as shown by FIG. 3A, in at least one embodiment, the status information line 320 can include one or more time stamps that indicates the time (day and/or hour) at which a given message was assessed by one or more participants. In one or more embodiments in order to reduce clutter of the user interface 300 any location tags, device tags, time stamps, or other supplementary access information can be initially hidden from view. Upon selection of a given message or access notification element, an associated location tag, device tag, time stamp, or other supplementary access information can appear in the user interface 300.

Figure 3B:
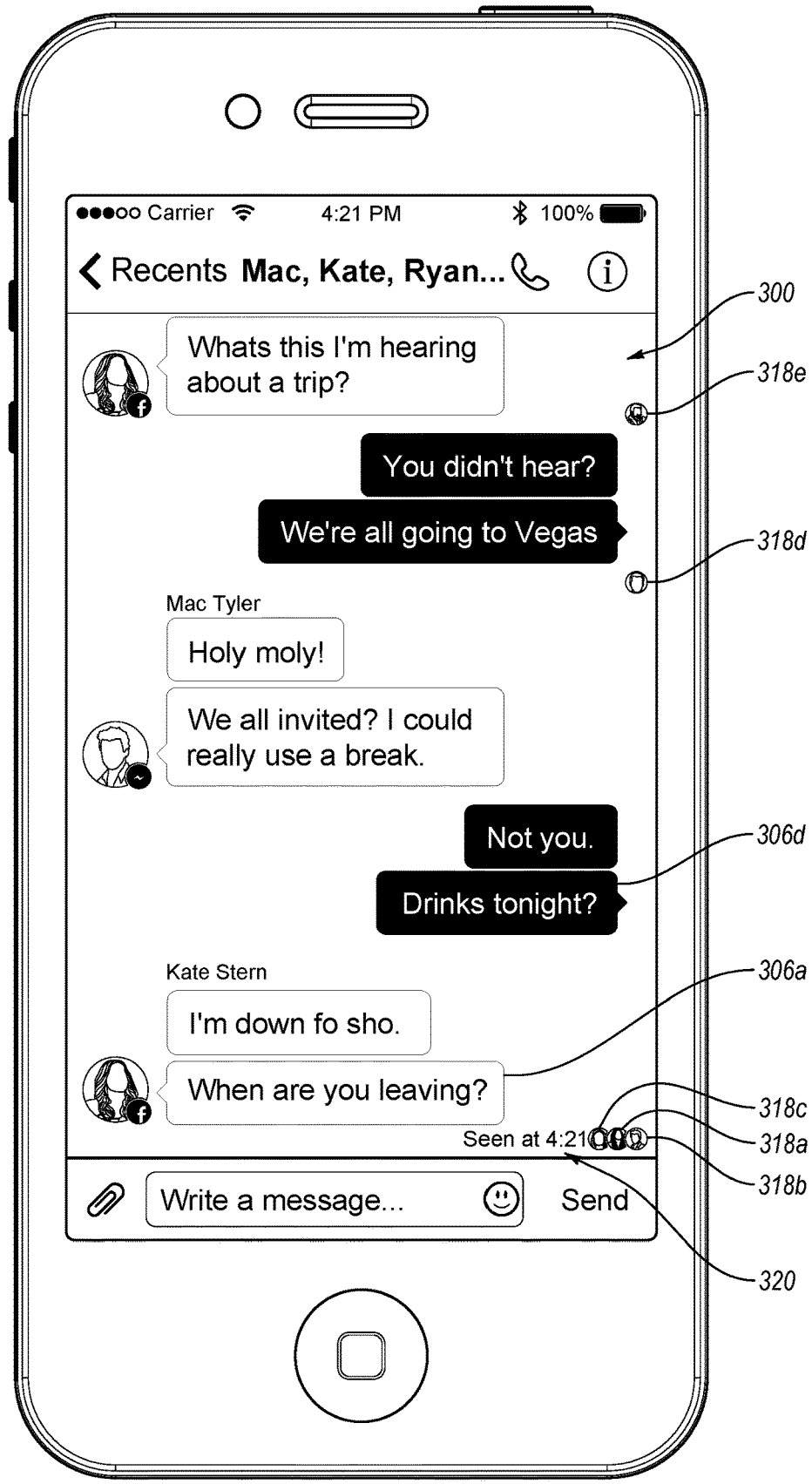

As mentioned previously, the messaging application 102 can update the user interface 300 as the messaging application 102 identifies changes in statuses of one or more of the messages 306. For example, FIG. 3B illustrates the user interface 300 after having been updated by the GUI updater 222 in response to the access detector 218 receiving an indication from the status indicator 236 that the second participant accessed the most recent message 306a. In particular, a comparison of FIG. 3A to FIG. 3B shows that the GUI updater 222 moved the second status notification element 318b from a position adjacent message 306d to an updated position adjacent message 306a.

The user interface 300 can further arrange multiple status notification elements next to the same message 306 in the order in which the associated participants accessed the message. For example, FIG. 3B illustrates that the GUI updater 222 added the second status notification element 318b at the right side of the status notification element 318c, 318a. Thus, the user interface 300 can notify the user the order in which various participants access or view a particular message. As shown by FIG. 3B, the status notification elements 318c, 318a, 318b next to message 306a indicate that the third participant accessed the message 306a first, followed by the first participant, and finally the third participant.

In addition to the foregoing, upon identifying a change in the status of most recent message 306a (i.e., that the second participant accessed the message 306a), the GUI updater 222 can update the status information line 320 associated with the message 306a. For example, FIG. 3B illustrates that the GUI updater 222 can modify the time stamp from a time in which the last participant (i.e., the first participant) accessed the message 306a (i.e., yesterday at 3:30 as shown by FIG. 3A) to the time in which the second participant accessed the message 306a (i.e., 4:21). Additionally, in one or more embodiments the status information line 320 can include a time stamp indicating when each participant accessed the message 306a. The GUI updater 222 can modify each time stamp as participants access messages 306. In alternative embodiments, when the status information line 320 includes other status information (e.g., location or device tags), the GUI updater 222 can also add, delete, update, or revise this additional information.

FIG. 3B further illustrates that the status notification elements 318e, 318d, 318c, 318a remain unchanged (i.e., in the same positions as in FIG. 3A). In other words, the GUI updater 222 can update or move only the status notification elements corresponding to a status update received from the access detector 222 or the status indicator 236. Along related lines, the GUI updater 222 can leave time stamps associated when a participant accessed a particular message unchanged until the participant accesses a new message. Thus, the last message a participant accessed can have a status notification element 318 and a time stamp when the participant accessed the message. This can allow the user to readily identify when and which messages a participant has accessed. Furthermore, in one or more embodiments the GUI updater 222 can update the user interface 300 in real time or substantially real time as the messaging application 102 becomes aware of status changes.

Figure 3C:
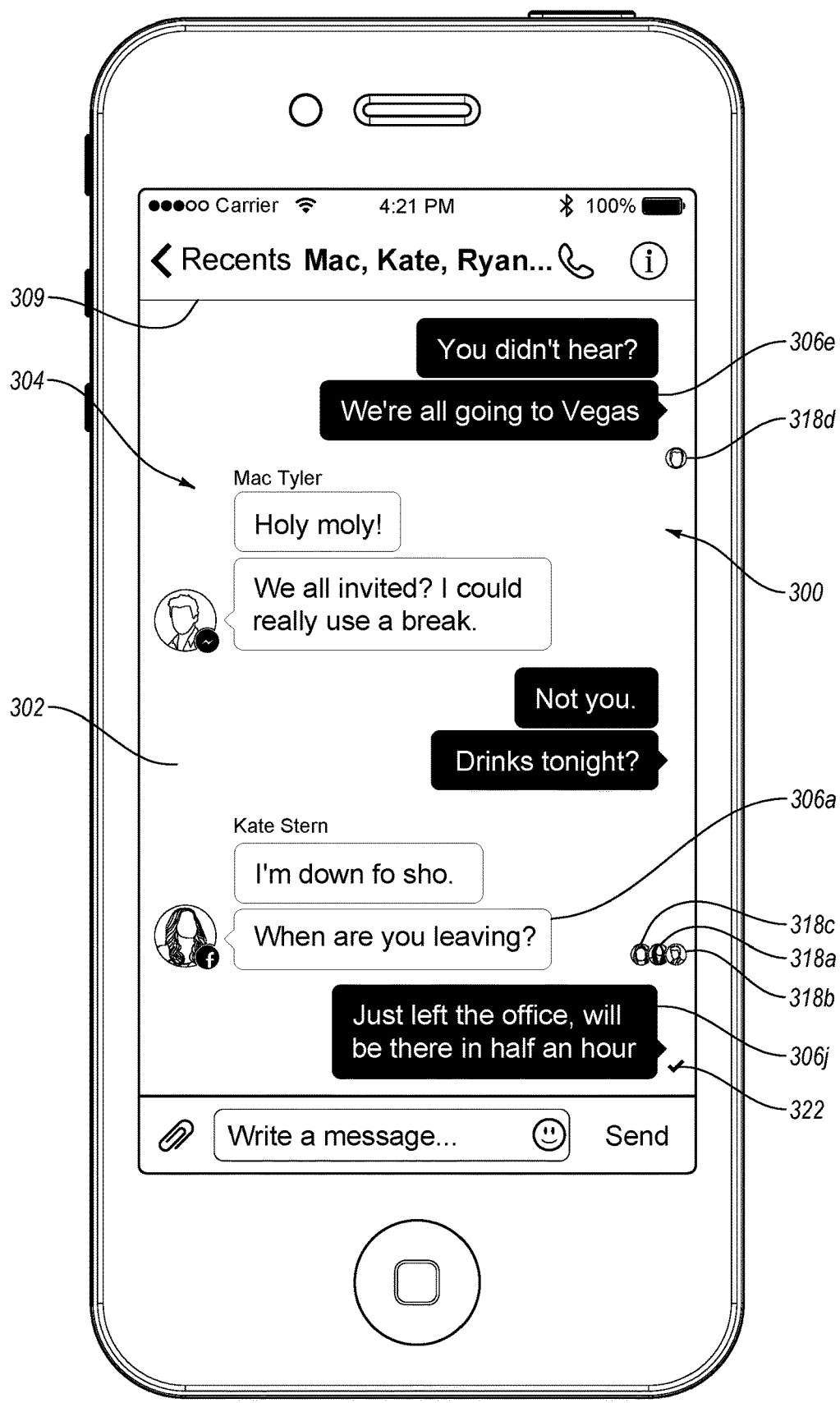

As mentioned previously, the user interface 300 can display new messages as they are received. For example, FIG. 3C illustrates the display of a new message 306j entered by the user of the computing device 202. In particular, the GUI updater 222 adds the new message 306j to the bottom of the communication thread 304.

As part of processing the new message 306j, the message handler 224 can send the new message 306j to the network application 225. Upon receiving the new message 306j, the server message handler 233 can send or forward the new message 306j to computing devices associated with each of the participants in the communication thread 304. The computing devices of the participants can each return delivery receipts to the communication server 106 upon receiving the new message 306j. Upon successful delivery, the communication server 106 can return a delivery confirmation to the computing device 202. In response to the receipt of the delivery confirmation, the GUI updater 222 can add a delivery notification 322 to the communication thread 322 to notify the user that the new message 306j was successfully delivered, as illustrated by FIG. 3C.

In one or more embodiments, delivery notification 322 indicates that the new message 306j has been delivered to all intended participants (i.e., accounts or devices associated with the participants) in the conversation. In alternative embodiments the delivery notification 322 can indicate that the new message 306j has been delivered to the communication server 106. In still further embodiments the delivery notification 322 indicates that the new message 306*j* has been delivered to a least one of the participants.

In the embodiment illustrated in FIG. 3C, the delivery notification 322 comprises a checkmark. One will appreciate in light of the disclosure herein that the present invention is not so limited. In alternative embodiments the delivery notification 322 can comprise an indicator other than a checkmark. For example, the delivery notification can comprise a change in the appearance or position of the message 306*j*, an icon other than a checkmark, a picture or animation, a glyph, or any other indicator suitable for indicating the delivery of a message.

In alternative embodiments rather than a delivery notification 322, the GUI updater 222 can add a sent notification to the communication thread 322 to notify the user that the new message was successfully sent. The sent notification can appear or function similar to the delivery notification. In alternative embodiments, the GUI updater 22 can provide both a sent notification and a delivery notification. For example, the sent notification can comprise a first check mark or other icon and the delivery notification can comprise a second check mark or other notification.

As shown by FIG. 3C, even though the new message 306*j* has been send or delivered, no participants have accessed the new message 306*j*. Accordingly, the GUI updater 222 has not moved any access notification elements 318*a*-318*e* adjacent the new message 306*j*. Similarly, the GUI updater 222 has not added or associated a status information line with the new message 306*j*.

FIG. 3C illustrates that the access notification element 318*e* is no longer within the viewing area 302. In particular, due to the addition of the new message 306*j* to the communication thread 304, the GUI updater 222 has moved the message 306*b* beyond the top 309 of the viewing area 302. As the message 306*b* is the last message accessed by the fifth participant, the access notification element 318*e* remains adjacent the message 306*b*, and thus, is no longer within the view area 302. If the user forgets or otherwise desires to confirm which was the last message accessed by the fifth participant, the user can scroll the communication thread 304 downward toward to re-expose less recent messages. For example, the user can modify the viewing area 304 to return to the view shown in FIG. 3B to see where the access notification element 318*e* is located.

In alternative embodiments, when the last message accessed by a given participant is no longer within the viewing area 302, the access notification element 318*e* can be positioned at the top of the viewing area 302 to indicate that the last message the participant accessed is further up in the communication thread 304. When the user taps or otherwise selects the access notification positioned at the top of the viewing area 302, the GUI updater 222 can automatically adjust the viewing area 302 to show the position in the communication thread 304 including the message last accessed by the participant. In other words, upon detecting a user selection of an access notification element 318*e* positioned at the top of the viewing area 302, the GUI updater 222 can automatically scroll the communication thread 304 so that the viewing area 302 shows the last message accessed by the participant.

Figure 3D:
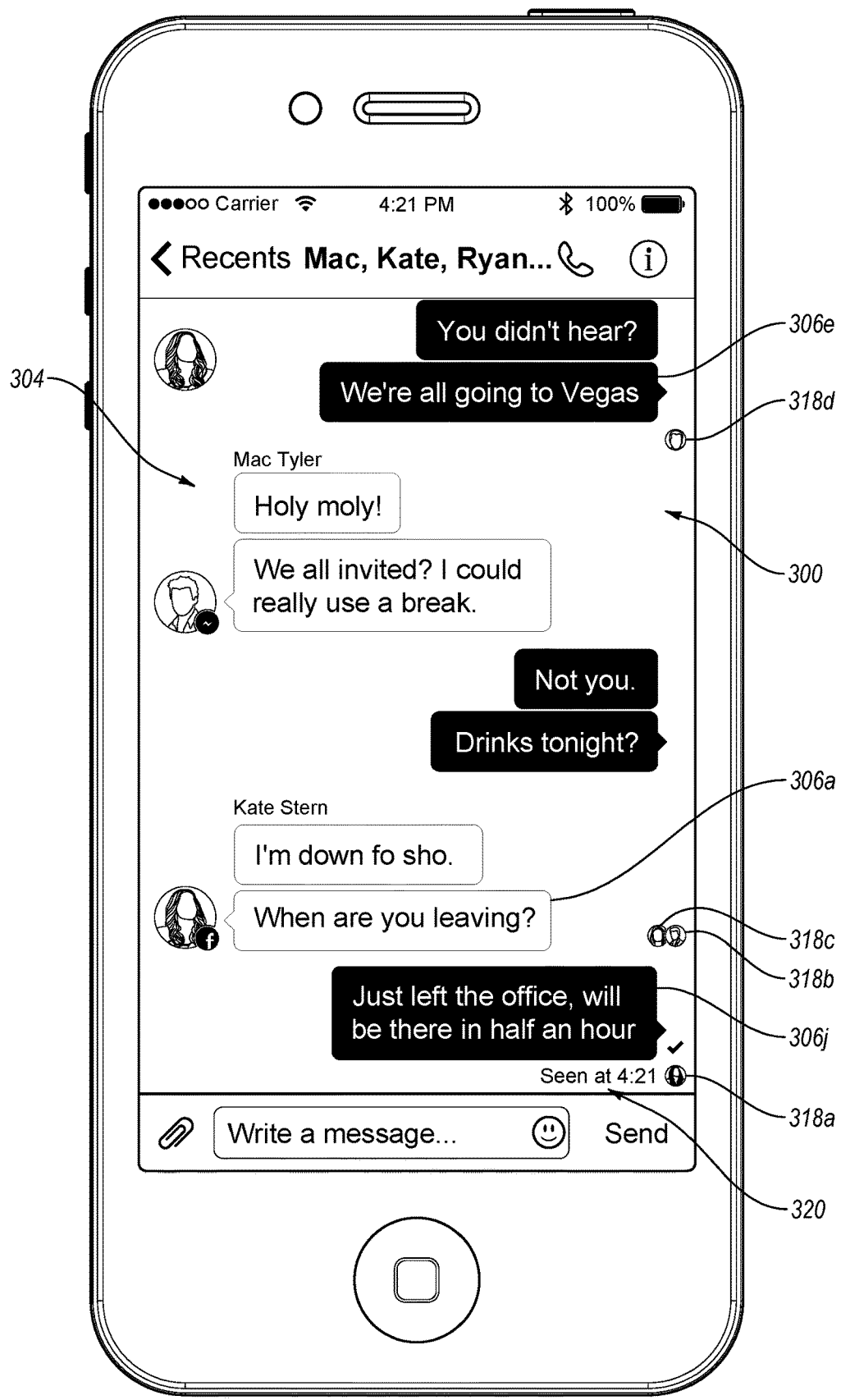

As mentioned previously, the communication application 102 can continuously update the user interface 300 upon receiving indications of changes in the status of messages. For the messaging application 102 can update the user interface 300 as the messaging application 102 identifies changes in statuses of one or more of the messages 306. For example, FIG. 3D illustrates the user interface 300 after having been updated by the GUI updater 222 in response to the access detector 218 receiving an indication that the first participant accessed the message 306*j*. In particular, a comparison of FIG. 3D to FIG. 3C shows that the GUI updater 222 moved the first status notification element 318*a* from a position adjacent message 306*a* to an updated position adjacent message 306*j*. Similarly, FIG. 3D illustrates that the GUI updater 222 has added a status information line 320 indicating the time at which the first participant accessed the message 306*j*.

Figure 3E:
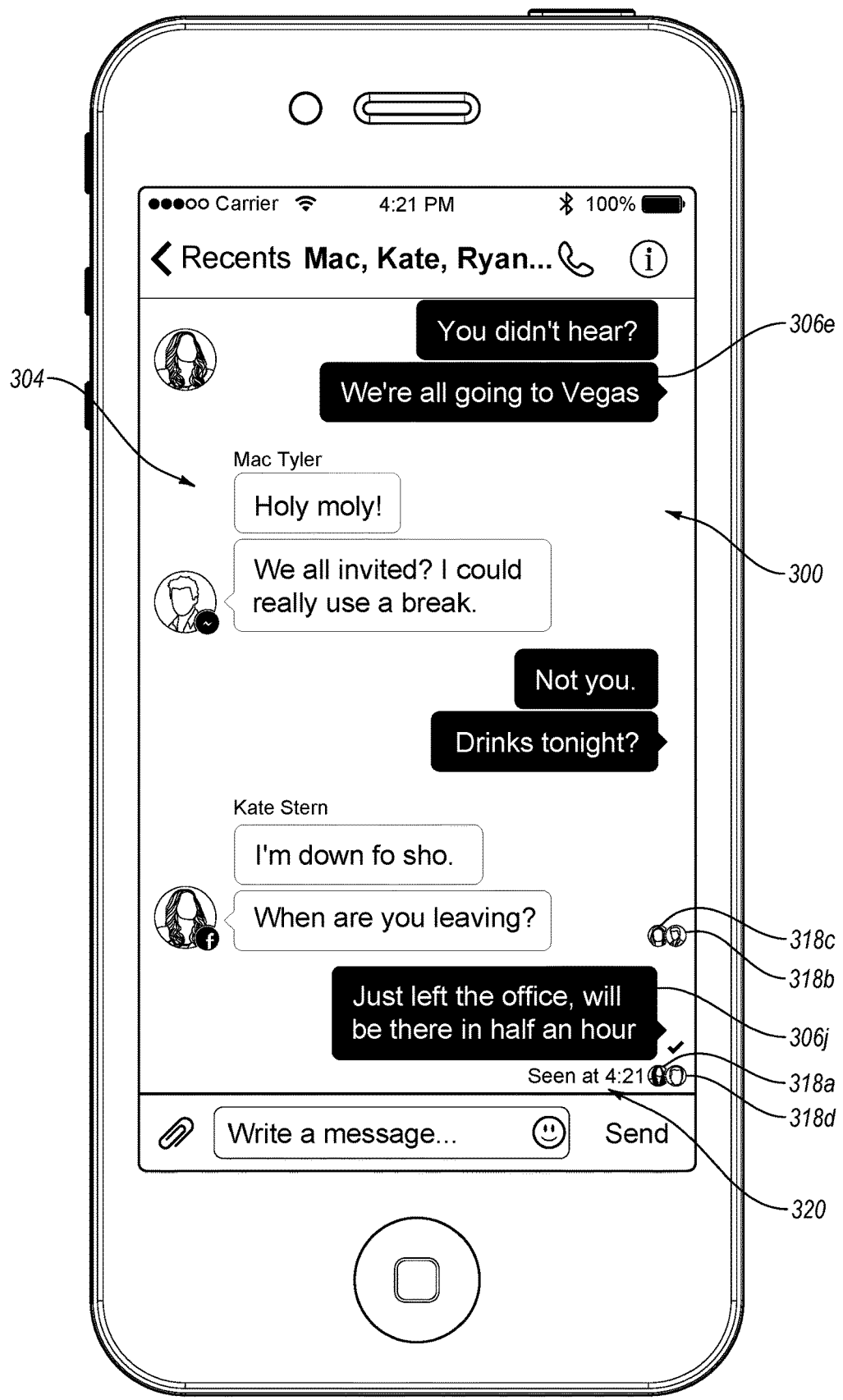

FIG. 3E illustrates the user interface 300 after having been updated by the GUI updater 222 in response to the access detector 218 receiving an indication that the fourth participant accessed the message 306*j*. In particular, a comparison of FIG. 3D to FIG. 3C shows that the GUI updater 222 moved the fourth access notification element 318*d* from a position adjacent message 306*e* to an updated position adjacent message 306*j*. One will appreciate that if a participant accesses multiple messages at the same time, the GUI updater 222 can move the associated access notification element directly to the most recent message accessed by the participant. Thus, in the context of FIG. 3E, the GUI updater 222 can move the fourth access notification element 318*d* directly from message 306*e* to message 306*j*, skipping over the messages between message 306*e* and message 306*j*.

Figure 3F:
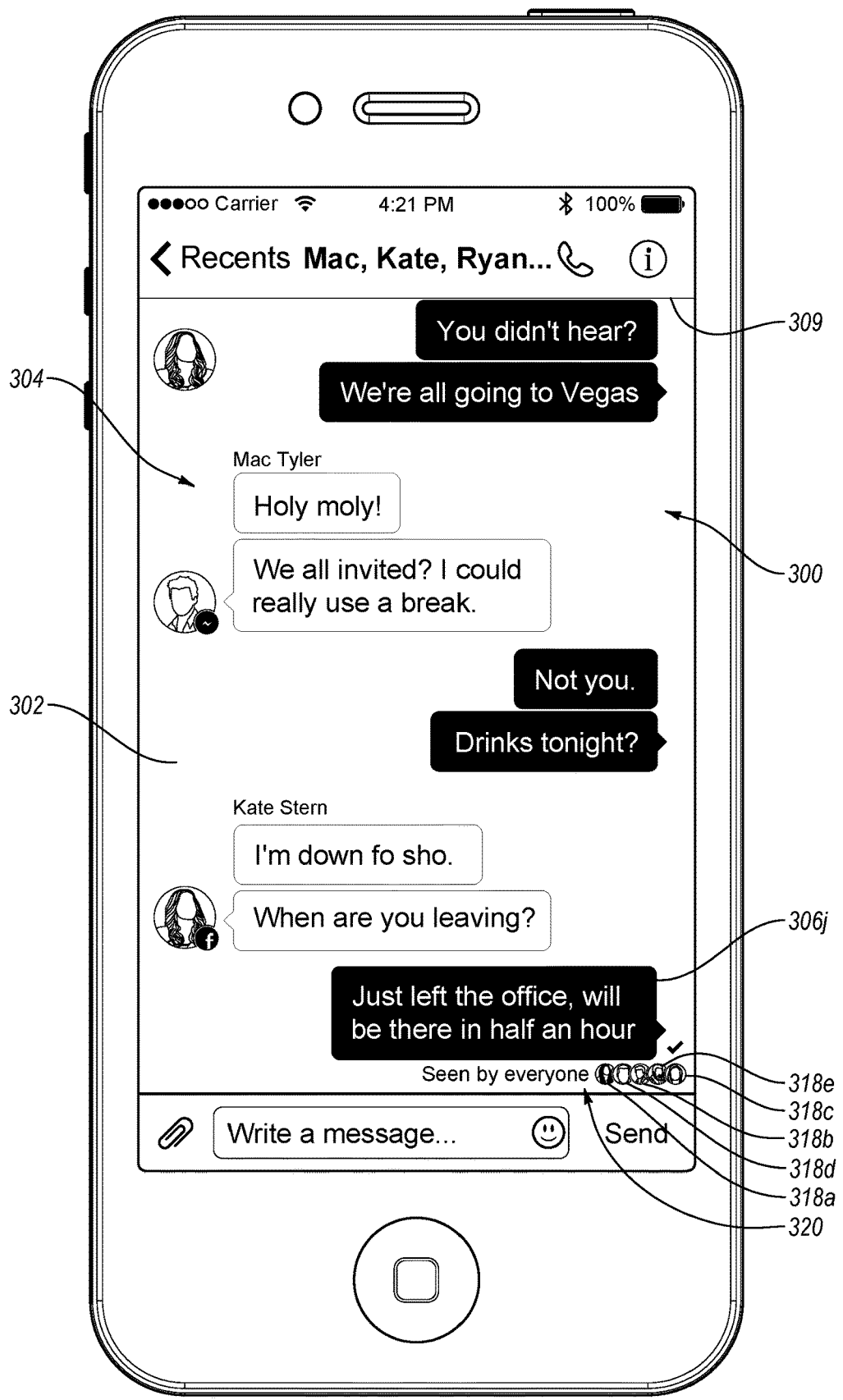

Eventually each participant in the communication thread 304 can access or otherwise view the message 306*j*. As shown by FIG. 3F, the GUI updater 222 can move each of the access notification elements 318*a*-318*e* adjacent the message 306*j* to reflect that the message 306*j* is the latest message accessed by each participant. Thus, the GUI updater 222 can move the access notification element 306*e* from beyond the top 309 of the viewing area 302 back into the viewing area 304.

Furthermore, the GUI updater 222 can update the status information line 320 to provide an indication that each participant has seen the message 306*j*. For example, FIG. 3F illustrates that the GUI updater 222 has changed the status information line 320 to say "Seen by everyone." In alternative embodiments, the GUI updater 222 can provide some other message, icon, animation or other indication to signal that each participant has accessed the message 306*j*. One will appreciate in light of the disclosure herein that such a notification can prevent the user from scrolling through the entire communication thread 304 to ensure that each participant has accessed the message.

Although not illustrated in FIGS. 3A-3F, each time a participant accesses a new message in the communication thread 304, the GUI updater 222 can animate the movement of the access notification elements. For example, as an access notification element moves to a more recent message, the access notification element may appear to bounce or have another animation. Furthermore, the GUI updater 222 can control the speed as well as the size of the bounce to reflect the length of travel in order to reach a message. The animation may also include sounds.

In one or more embodiments, the animation and/or sound associated with the movement of a particular access notification element can be specific to the participant associated with the access notification element. For example, the participant or the user can select an animation or sound to associate with a given access notification element. Thus, the animation and/or sound associated with an access notification element can indicate to the user who has seen a given message in addition to the appearance of the access notification element.

As mentioned previously the present invention is not limited to providing group messaging conversations or providing only access notifications. Indeed, one or more embodiments of the present invention include providing additional or alternative status notifications in group or non-group conversations. For example, FIGS. 4A-4F illustrate another embodiment in which the communication application 102 provides sent and delivery notifications.

Figure 4A:
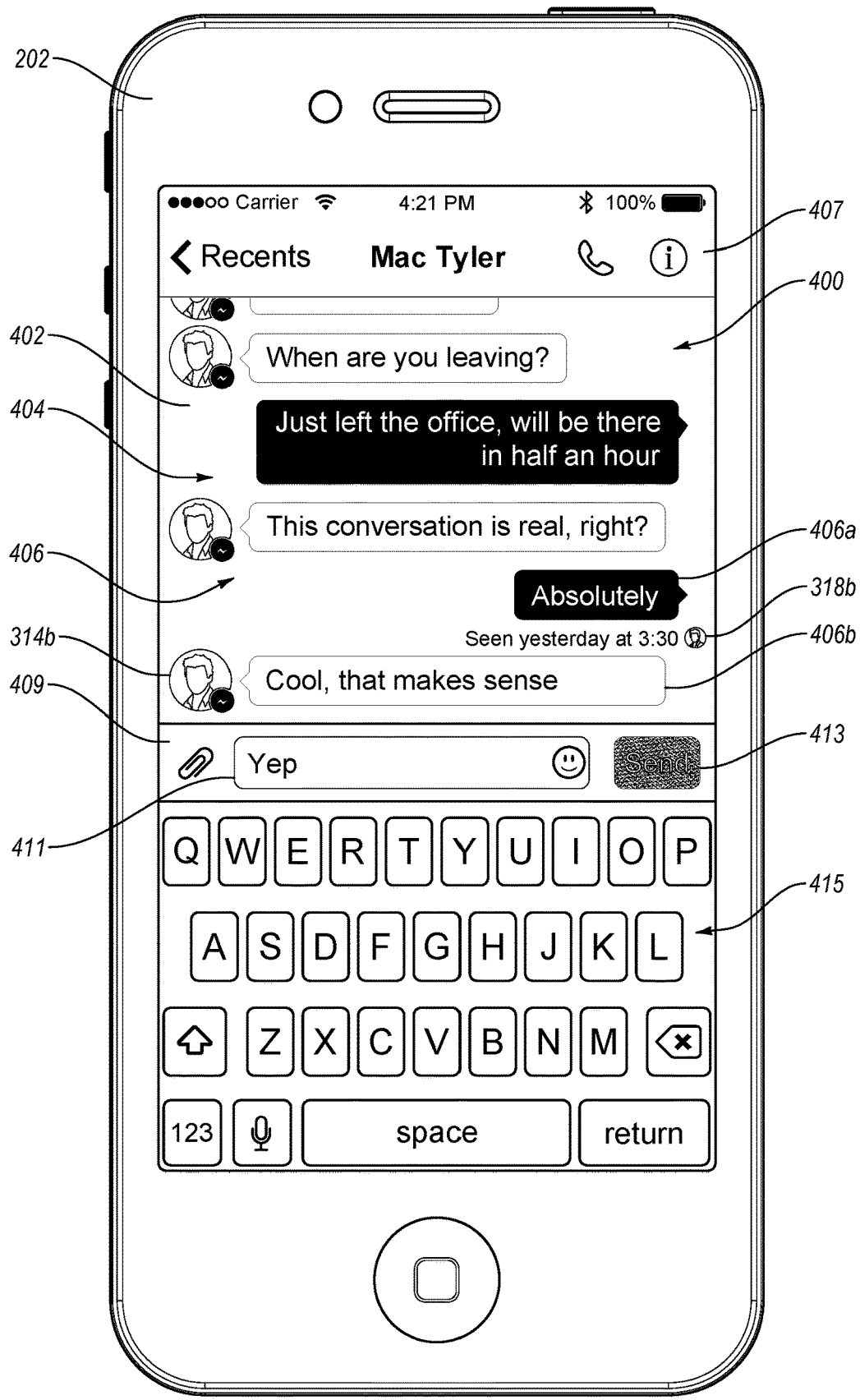
FIGS. 4A-4F illustrate various views of another user interface of a messaging application including status notifications in accordance with one or more embodiments.

FIG. 4A illustrates an example of a display of an electronic messaging graphical user interface 400 (or simply "user interface 400"). Upon a user 104 opening the messaging application 102 on the communication device 202 and selecting a conversation, the GUI generator 220 presents a user with the display illustrated in FIG. 4A. As shown, the user interface 400 includes a viewing area 402 displaying at least a portion of a communication thread 404. The communication thread 404 includes a plurality of messages 406 exchanged between a co-participant and a user of the communication device 202.

As with the previous examples, the communication thread 404 is displayed with the newest messages added to the bottom of the communication thread 404. As each new message is added to the communication thread 404, the GUI updater 222 moves older messages up the communication thread 404 until the oldest messages are no longer visible within the communication thread 404. The user interface 400 may include functionality that allows the user to scroll up and down the communication thread 404 such that the user may read all the messages in the communication thread 404. In FIG. 4A, the newest message 406b is from the co-participant and is displayed at the bottom of the communication thread 404.

In the communication thread 404, the co-participant is the second participant from the communication thread 304 shown in FIGS. 3A-3F. Thus, the user interface 400 can include the second participant notification element 314b adjacent messages from the co-participant. Similarly, the user interface includes the access notification element 318b adjacent the most recent message 406b accessed by the co-participant.

In one or more embodiments, the user interface of the messaging application can position access notification elements adjacent the most recent messages accessed or seen by a participant regardless of whether the participant sent the message, as explained above in relation to FIG. 3A. Alternatively, the user interface of the messaging application can position access notification elements adjacent the most recent messages accessed or seen by a participant that are sent by someone other than the participant. For example, FIG. 4A illustrates that the access notification element 318b is adjacent message 406a sent by the user rather than adjacent message 406b sent by the co-participant.

Also shown in FIG. 4A, the user interface 400 may include other features such as a navigation bar 407 and an input bar 409. For example, as shown in FIG. 4A, the navigation bar 407 may include selectable options to initiate a phone call with a participant, navigate between different conversations, or access additional information. The input bar 409 may include a message input area 411 as well as other interactive elements for attaching files, images, icons, or other media, as well as a selectable send option 413.

In one or more embodiments, upon user selection of the message input area 411, the user interface 400 can display one or more input options to allow the user to provide a message. For example, FIG. 4A illustrates that the user interface 400 can display a touch keyboard. It will be understood that the input may be any other means suitable for inputting messages for a communication session such as those describe below in relation to FIG. 8.

Figure 4B:
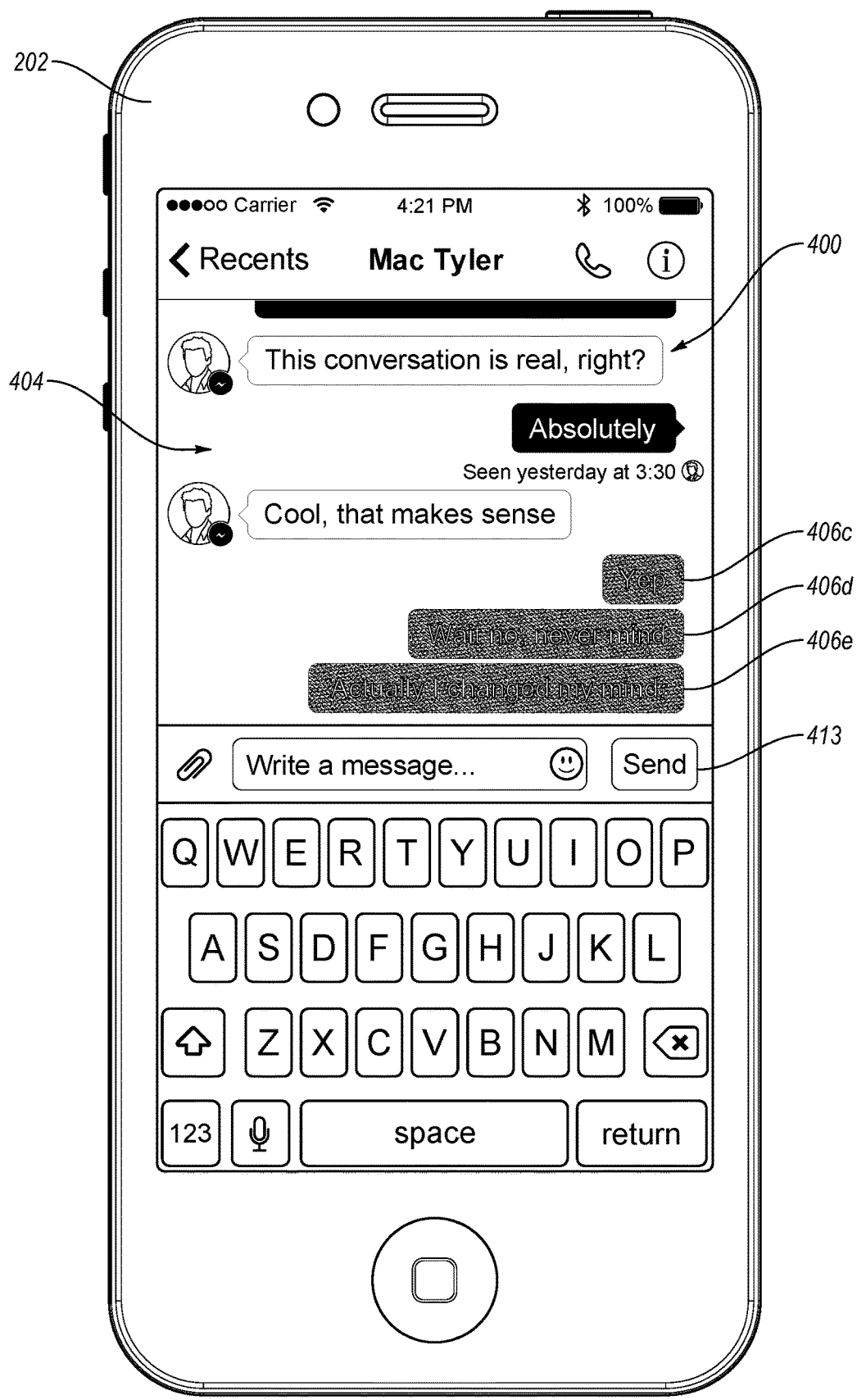

In FIG. 4B, the user inputs a message, "Yup," into the message input area 411. The selectable send option 413 may include functionality to become activated when a message is inputted into the message input area 411. This functionality prevents the user from sending a blank message to the co-user in the communication session. The user may be alerted to the activation of the selectable send option 413 when the selectable send option 413 changes color. As shown in FIG. 4A, the selectable send option 413 is a dark color as a message has been input into the message input area 411. In contrast, FIGS. 4B-4F illustrate the message input area 411 in a light or grey-out color. It will be understood that the activation of the selectable send option 413 may be indicated in any suitable method, such as via a sound, via an animation, etc.

After inputting a message into the message input area 411, the user may select the selectable send option 413. Upon selection of the message input area 411, the GUI updater 222 can clear the message from the message input area 411 and add the message to the communication thread 404, as shown in FIG. 4B. FIG. 4B shows a series of messages 406c, 406d, 406e input by the user. Additionally, after selection of the selectable send option 413, the message is handed off to the message handler 224, which in turn forwards the message to the server message handler 233.

In order to provide indications of the status of the messages 406c-406e, the user interface 400 can present the messages with various appearances or positions. For example, FIG. 4B illustrates that the messages 406c-406e have a first appearance (i.e., a gray color) to indicate that the messages have not been sent from the computing device 202 or are in the process of being sent. One will appreciate that depending on the user's computing device 202 and the network 108 the computing device 202 is operating on, the messages 406c-406e may be sent before or at the same time the messages 406c-406e are added to the communication thread 404. Alternatively, as shown by FIG. 4B, there may be a delay between the addition of the messages 406c-406e to the communication thread 404 and the sending of the messages from the computing device 202.

Figure 4C:
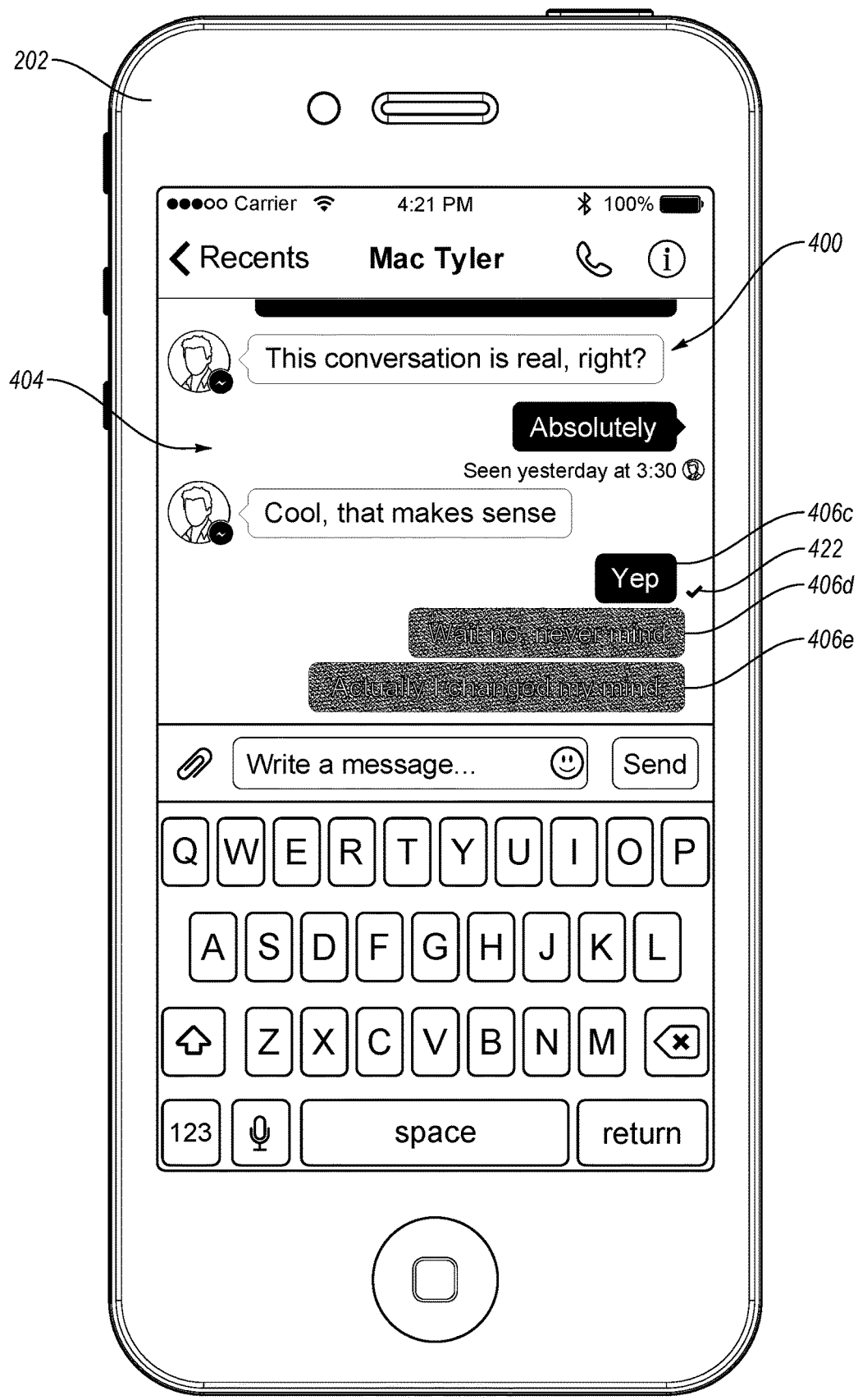

Upon the message handler 224 successfully sending a message from the computing device 202, the GUI updater 222 can provide a sent notification. In particular, the GUI updater 222 can change the appearance or position of the message. For example, FIG. 3C illustrates that the GUI updater 222 has changed the message 406c from a first color (grey) to a second color (black) to signify the message has been successfully sent. As shown by FIG. 4C, the second message 406d and third message 406e have yet to send as indicated by their lighter color.

One will appreciate in light of the disclosure herein that altering the appearance of the message, opposed to adding an additional graphical element or icon, can reduce clutter of the user interface 400. When using smaller computing devices 202, such as the mobile phone shown in FIG. 4C or other hand held devices, the display area may be limited. Thus, providing notifications by changing the appearance of a message and help conserve the display area and otherwise provide a cleaner user experience.

In alternative embodiments, the GUI updater 222 can change the size of the message, the position, or otherwise modify the appearance of the message to indicate a change in the status of the message. For example, the GUI updater 222 can change the size of the message from small to full size or vice versa to indicate a change in status. More specifically, the GUI updater can provide unsent messages with a first size, sent messages with a second size, and delivered messages with a third size. Alternatively, the GUI updater 222 can change the position and/or orientation of the message to indicate a change in status. More specifically, the GUI updater can position unsent messages in the lower left position of the viewing area 402, sent messages in the lower middle portion of the viewing area 402, and delivered messages in the lower right side of the viewing area 402. In any event, the GUI updater 222 can modify the appearance of a message to indicate a status of the message.

Alternatively, the GUI updater 222 can provide the message with an animation to indicate a change in the status of the message. For example, the GUI updater 222 can act as a status bar that completes as the message is sent. Thus, if the message is unsent only a portion of the message appears in the communication thread 404 or the message flashes or bounces until the message is sent.

FIG. 4C further illustrates that the messaging application can provide an indication that the message 406c has been successfully read or delivered. For example, as explained above in relation to FIG. 3C, upon the message 406c being successfully read or delivered, the GUI updater 222 can provide a read or delivery notification 422. In particular, FIG. 3C illustrates that the read or delivery notification comprises a checkmark. Alternatively, the GUI updater 222 can change the appearance of the message from a second appearance to a third appearance. For example, the GUI updater 222 can change the color of the message 406c from the second color (black) to a third color such as blue or another color different than the color used to indicate unsent or sent messages.

Figure 4D:
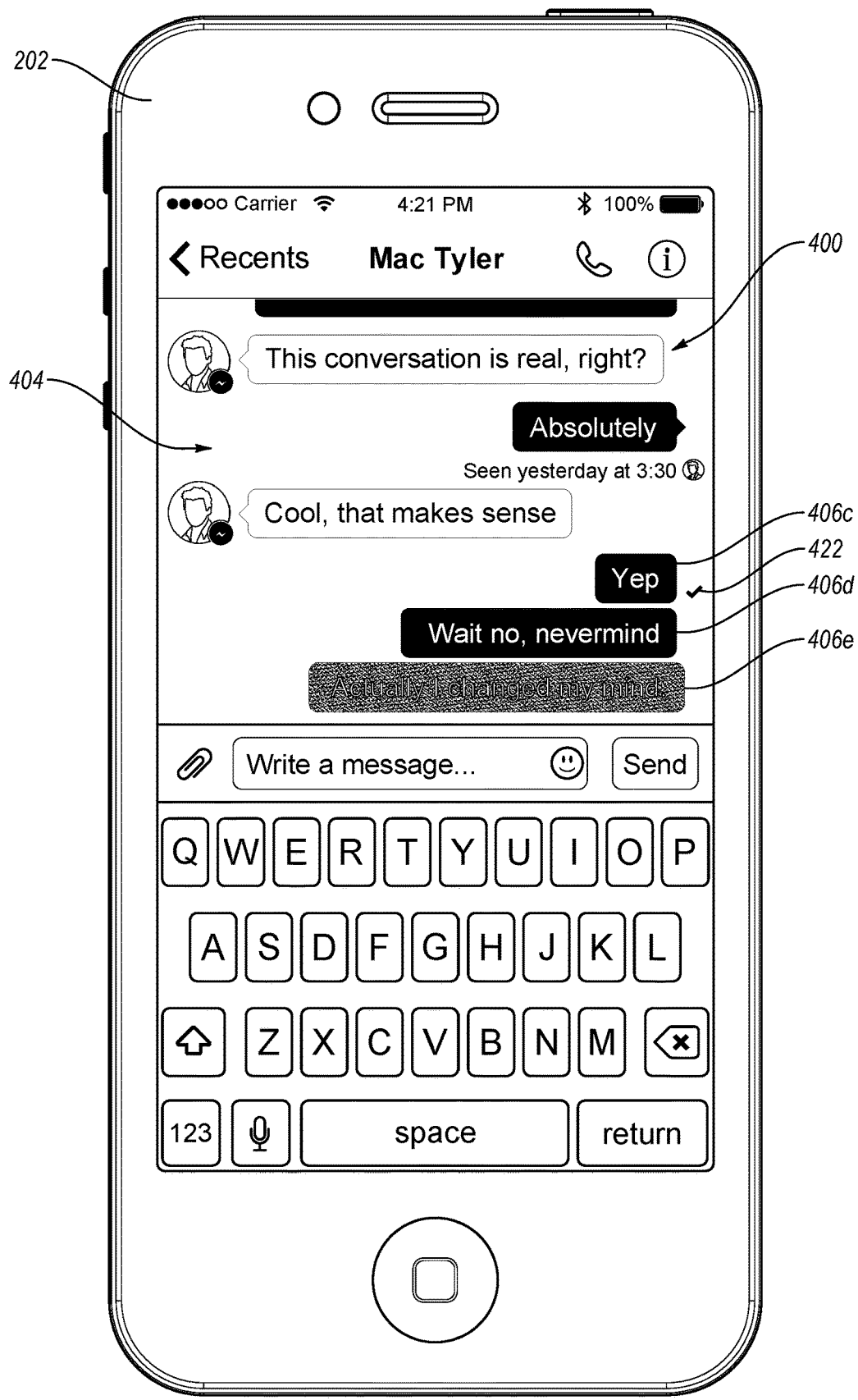
Figure 4E:
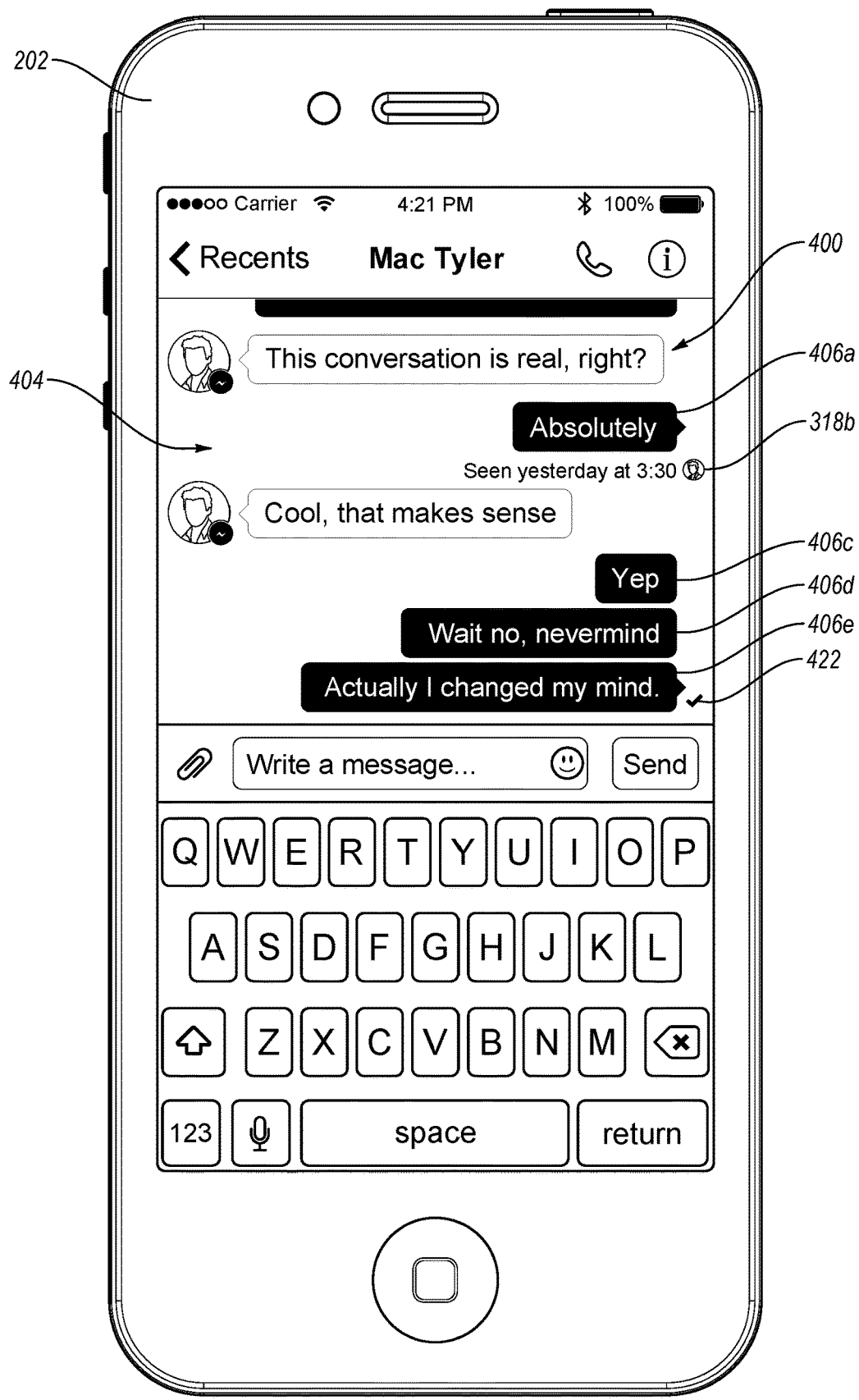

FIGS. 4D and 4E illustrate that the GUI updater 222 can provide the status notifications on a per message or per status change basis. In other words, the GUI updater 222 can provide a notification upon detection of a change of the status of the message. Although not shown, the movement of the delivery notification 422 down the communication thread 404 may be accompanied with animation and/or sounds.

Figure 4F:
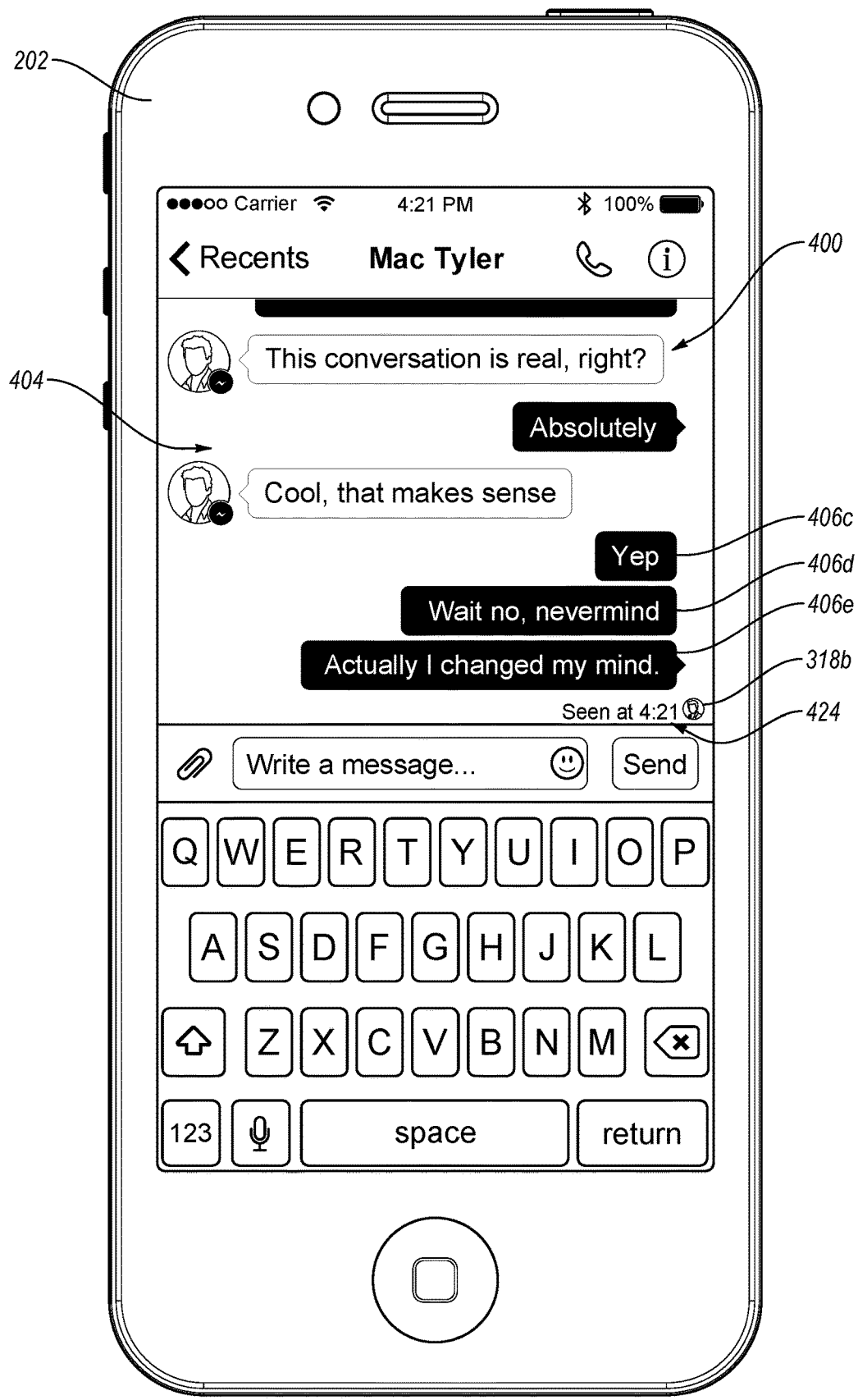

FIG. 4E illustrates that the first message 406c, the second message 406d, and the third message 406e have all been sent, as indicated by their change in color. Additionally, FIG. 4E illustrate that the messages 406c-406e have also been successfully delivered to the co-participant, as indicated by the delivery notification 422 adjacent to the third message 406e. FIG. 4E further illustrates that the co-participant has not yet accessed any of the messages 406c-406e. This is indicated via the position of the access notification element 318b being positioned adjacent electronic message 406a. FIG. 4F, on the other hand, illustrates that the co-participant has seen all three messages 406c-406e based on the updated position access notification element 318b next to the last message 406e.

Figure 5:
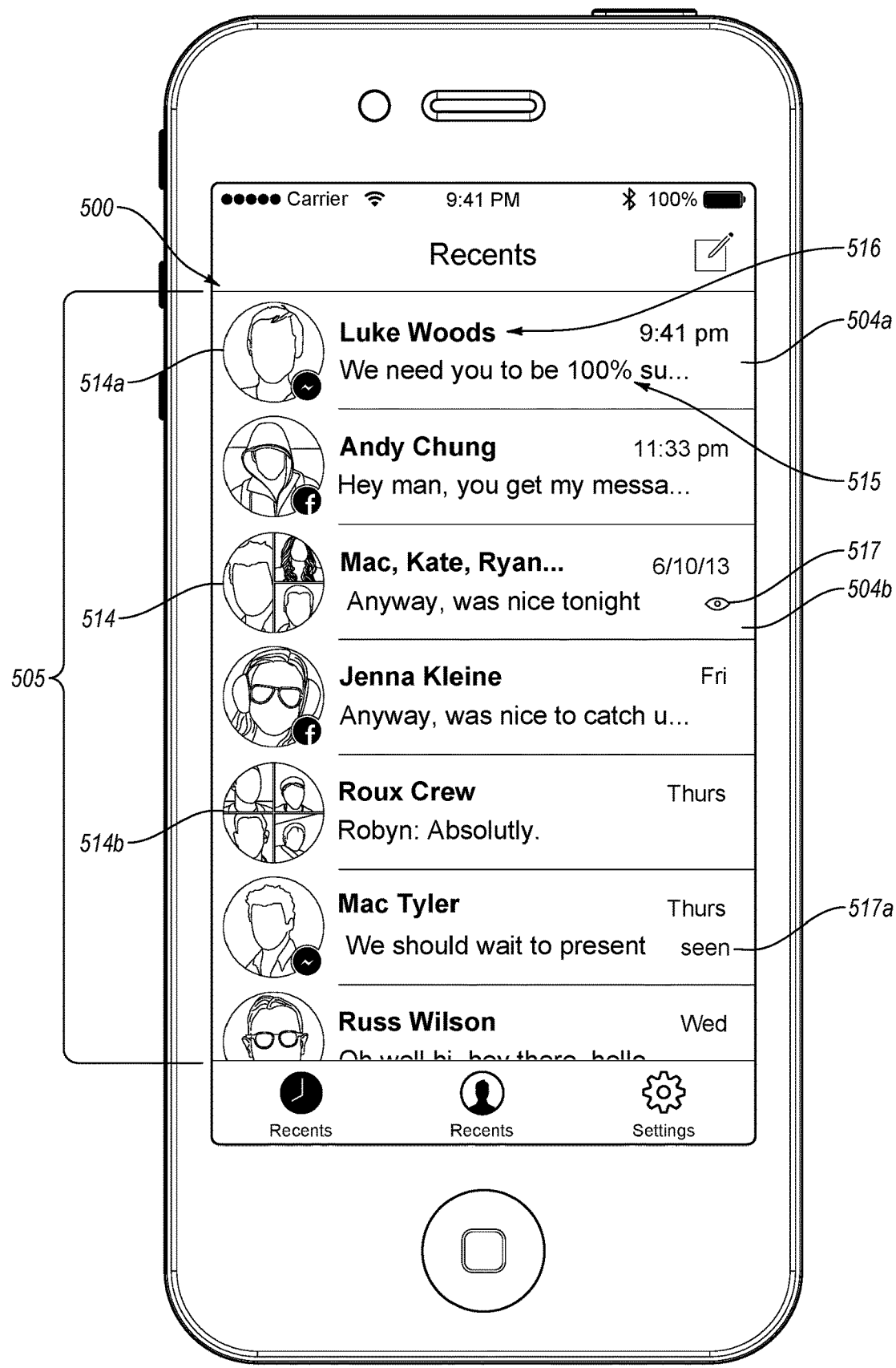
FIG. 5 illustrates yet another user interface of a messaging application including status notifications in accordance with one or more embodiments.

FIGS. 3A-4F all include user interfaces including a portion of a single communication tread in which a status of a message can be provided to a user. The present invention however is not so limited. For example, one or more embodiments can provide status notifications in other user interfaces of the messaging application. For example, FIG. 5 illustrates a user interface 500 that includes a listing 505 of various communication thread summaries 504a, 504c, etc.

Each communication tread summary 504, 504b can include information regarding or taken from a corresponding communication thread. For example, communication summaries can include a participant indicator 514, a thread excerpt 515, a conversation or thread title 516, and status notification 517. The participant indicator 514 may be one or more indications of the identity of the one or more participants in that communication thread. If the conversation thread is between the user and a single co-participant, the participant indicator 514a can include a single indicator. If the conversation thread includes multiple participants, the participant indicator 514b can include a plurality of participant indicators. As shown, the participant indicator 514 may be made of a photograph, icon, or other graphical element associated with or chosen by the user or the participant.

The thread excerpt 515 can comprise at least a portion of the most recent message in the communication thread. The thread excerpt 515 can provide a brief reminder to the user of where a particular communication thread left off. The thread excerpt 515 may be limited to a specific number of characters. The title 516 can comprise a name of the conversation provided by one of the participants. Alternatively, the title 516 can comprise the names of one or more of the participants if no title is provided.

The status notification 517 may notify the user of a status of the conversation or a latest message in the communication thread 504a. For example, the status notification can indicate that every participant in a communication thread has accessed the most recent message in that communication thread. The status notification 517 may be an icon 517, a word such as "seen" 517a, or other indicator suitable for communicating a status of the communication thread or a message therein.

Figure 6:
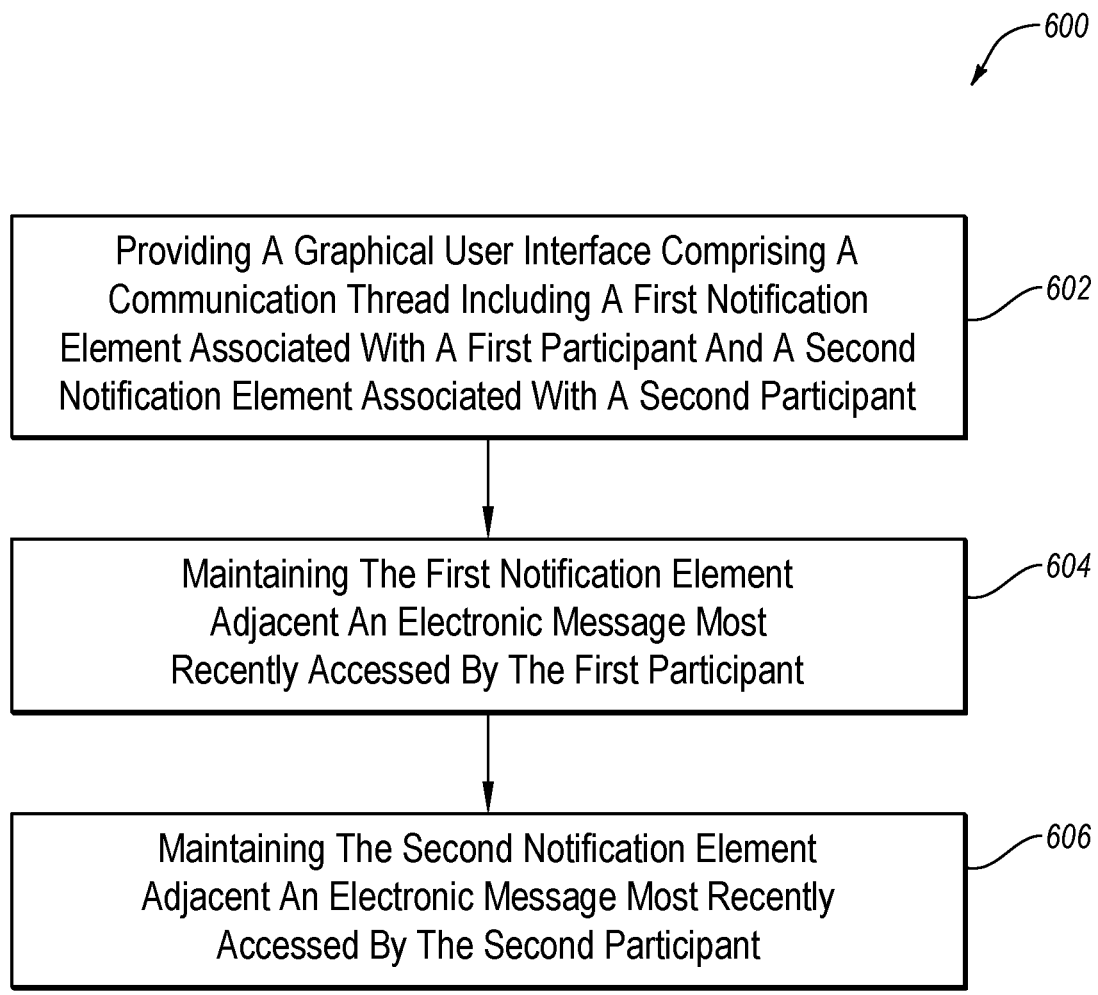
FIG. 6 illustrates a flowchart of a series of acts in a method of providing status notifications in accordance with one or more embodiments.
Figure 7:
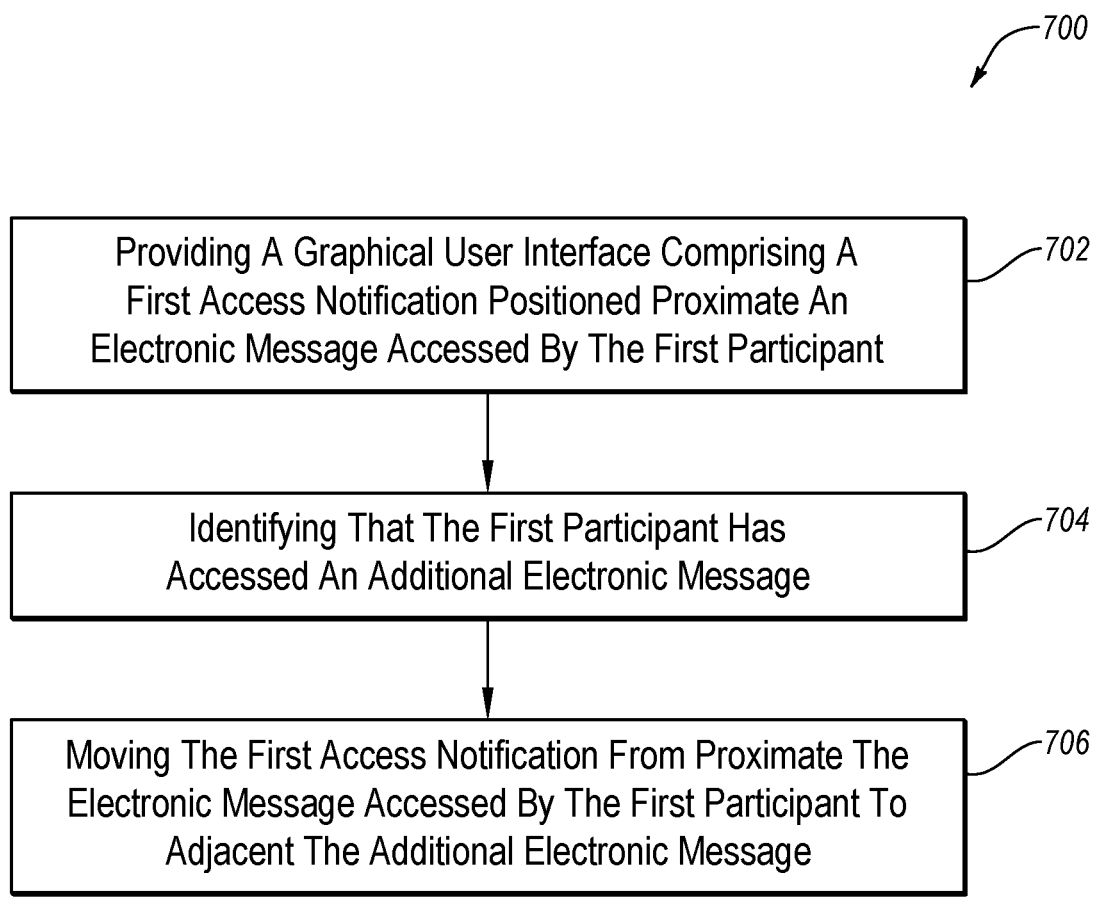
FIG. 7 illustrates a flowchart of a series of acts in another method of providing status notifications in accordance with one or more embodiments.

FIGS. 1-5, the corresponding text, and the examples, provide a number of different systems, device, and user interface for providing message status notifications. In addition to the foregoing, embodiments of the present invention also can be described in terms of flowcharts comprising acts and steps in a method for accomplishing a particular result. For example, FIGS. 6 and 7 illustrate flowcharts of exemplary methods in accordance with one or more embodiments of the present invention. The methods described in relation to FIGS. 6 and 7 may be performed with less or more steps/acts or the steps/acts may be performed in differing orders. Additionally, the steps/acts described herein may be repeated or performed in parallel with one another or in parallel with different instances of the same or similar steps/acts.

FIG. 6 illustrates a flowchart of one exemplary method 600 of providing status notifications during electronic messaging. In particular, FIG. 6 illustrates that method 600 can include an act 602 of providing a graphical user interface 300 comprising a communication thread 304 including a first access notification element 318a associated with a first participant and a second notification element 318b associated with a second participant. For example, act 600 can involve providing a user interface 300 including a communication thread 304 including a plurality of electronic messages 306 exchanged between a user, a first participant, and a second participant.

Method 600 can also include an act 604 of maintaining the first notification element 314a adjacent an electronic message 306a most recently accessed by the first participant. For example, act 604 can involve moving the first access notification element 318a from a first position adjacent a previously accessed electronic message 306a to a second position adjacent the additional electronic message 306j based on identifying that the first participant has accessed the additional electronic message 306j. The method 600 can also involve moving the first access notification element 318a based on identifying that the first participant has accessed the additional electronic message 306j.

FIG. 6 further illustrates that method 600 can include an act 606 of maintaining the second notification element 314b adjacent an electronic message 306d most recently accessed by the second participant. For example, act 606 can involve leaving the second access notification element 318b adjacent an electronic message 306d previous accessed by the second participant despite the adding of an additional electronic message 306j to the communication thread 304. Act 606 can further involve leaving the second access notification 318b adjacent an electronic message 306d previous accessed by the second participant despite moving for the first access notification element 318a from the first position to the second position. Act 606 can further involve identifying that the second participant has accessed the additional electronic message 306j. Act 606 can accordingly involve moving the second access notification element 318b from adjacent the electronic message 306d previously accessed by the second participant to a position adjacent the additional electronic message 306j based on identifying that the second participant has accessed the additional electronic message 306j.

Method 600 can further involve receiving an input from the user of the additional electronic message 306j via the graphical user interface 300. Method 600 can also involve displaying the additional electric message 406c with a first appearance in the communication thread. Additionally, method 600 can involve determining a change in a status of the additional electronic message 406c and changing the first appearance of the additional electronic message 406c to a second appearance based on the determination that the change in the status of the additional electronic message 406c. Determining the change in the status of the additional electronic message 406 can involve determining that the additional electronic message 406c was successfully sent or delivered. Changing the first appearance of the additional electronic message 406c to the second appearance can involve changing a color or the additional electronic message 406c.

Referring now to FIG. 7, a flowchart of one exemplary method 700 of providing access notifications during electronic messaging is illustrated. As shown, the method 700 can include an act 702 of providing a graphical user interface 300 comprising a first access notification 318b positioned proximate an electronic message 306d, 406a accessed by the first participant. More specifically, act 702 can involve providing a communication thread 300, 400 including a plurality of electronic messages 306, 406 exchanged between a user and a first participant. Furthermore, act 702 can involve persistently including the first access notification 318b in the communication thread 300, 400.

Method 700 also includes an act 704 of identifying that the first participant has accessed an additional electronic message 306i, 406b. In particular, act 704 can involve receiving an indication from a communication server that first participant has accessed the additional electronic message 306i, 406b. Method 700 can also involve moving the first access notification 318b from proximate the electronic message 306d, 406a accessed by the first participant to adjacent the additional electronic message 306i, 406b.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the invention can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be implemented in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the invention. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
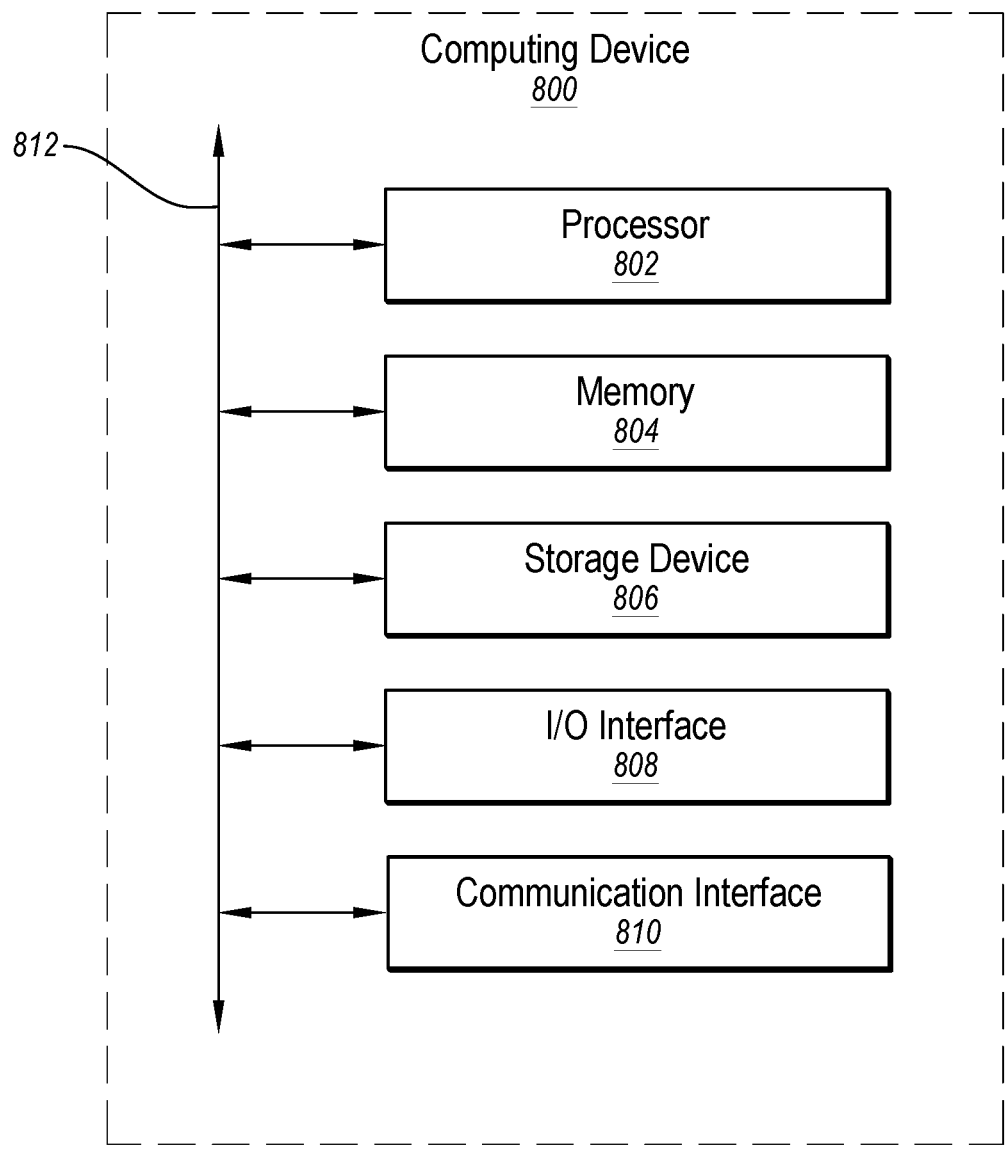
FIG. 8 illustrates a block diagram of an exemplary computing device in accordance with one or more embodiments.

FIG. 8 illustrates, in block diagram form, an exemplary computing device 800 that may be configured to perform one or more of the processes described above. One will appreciate that the client device 202 and the communication server 106 can comprise implementations of the computing device 800. As shown by FIG. 8, the computing device can comprise a processor 802, memory 804, a storage device 806, an I/O interface 808, and a communication interface 810. While an exemplary computing device 800 is shown in FIG. 8, the components illustrated in FIG. 8 are not intended to be limiting. Additional or alternative components may be used in other embodiments. Furthermore, in certain embodiments, a computing device 800 can include fewer components than those shown in FIG. 8. Components of computing device 800 shown in FIG. 8 will now be described in additional detail.

In particular embodiments, processor(s) 802 includes hardware for executing instructions, such as those making up a computer program. As an example and not by way of limitation, to execute instructions, processor(s) 802 may retrieve (or fetch) the instructions from an internal register, an internal cache, memory 804, or a storage device 806 and decode and execute them. In particular embodiments, processor(s) 802 may include one or more internal caches for data, instructions, or addresses. As an example and not by way of limitation, processor(s) 802 may include one or more instruction caches, one or more data caches, and one or more translation lookaside buffers (TLBs). Instructions in the instruction caches may be copies of instructions in memory 804 or storage 806.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The computing device 800 includes a storage device 806 includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. Storage device 806 may include removable or non-removable (or fixed) media, where appropriate. Storage device 806 may be internal or external to the computing device 800. In particular embodiments, storage device 806 is non-volatile, solid-state memory. In particular embodiments, Storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 800 also includes one or more input or output ("I/O") devices/interfaces 808, which are provided to allow a user to provide input to (such as user strokes), receive output from, and otherwise transfer data to and from the computing device 600. These I/O devices/interfaces 808 may include a mouse, keypad or a keyboard, a touch screen, camera, microphone, optical scanner, network interface, modem, other known I/O devices or a combination of such I/O devices/interfaces 808. The touch screen may be activated with a stylus or a finger.

The I/O devices/interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 808 is configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 can provide one or more interfaces for communication (such as, for example, packet-based communication) between the computing device and one or more other computing devices 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 810. As an example and not by way of limitation, computing device 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 800 may include any suitable communication interface 810 for any of these networks, where appropriate.

The computing device 800 can further include a bus 812. The bus 812 can comprise hardware, software, or both that couples components of computing device 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

The computing device 202 and/or the messaging application 102 can communicate with the communication server 106 using any number of various protocols. In other words, the messages can comprise a number of different formats or protocols. For example, computing device 202 and/or the messaging application 102 can communicate with the communication server 106 using the Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

As mentioned above, the network application 226 can comprise a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia files to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 9:
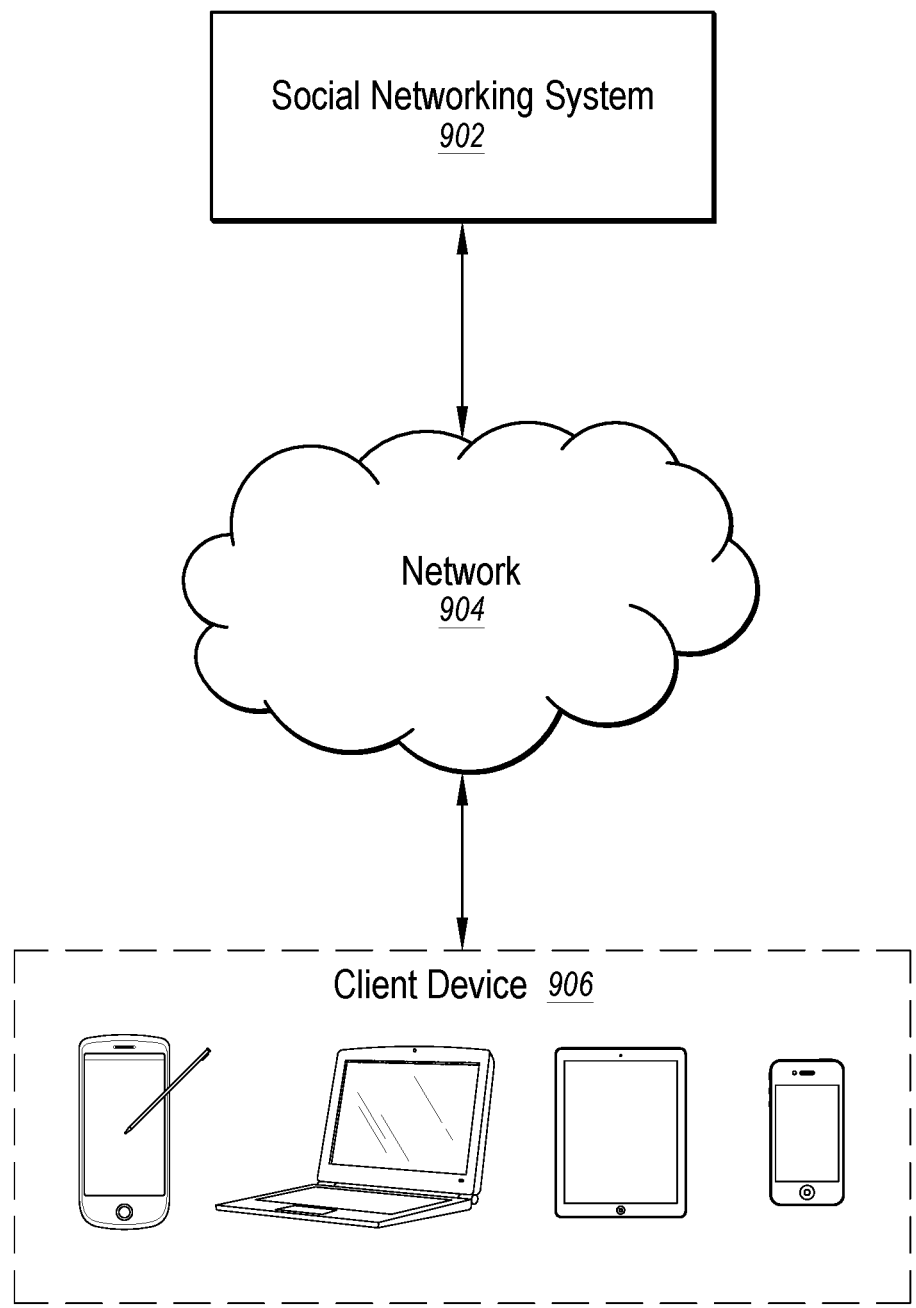
FIG. 9 is an example network environment of a social networking system in accordance with one or more embodiments.

FIG. 9 illustrates an example network environment of a social-networking system. In particular embodiments, a social-networking system 902 may comprise one or more data stores. In particular embodiments, the social-networking system 902 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system 902 may comprise one or more computing devices (e.g., servers) hosting functionality directed to operation of the social-networking system. A user of the social-networking system 902 may access the social-networking system 902 using a client device such as client device 906. In particular embodiments, the client device 906 can interact with the social-networking system 1202 through a network 904.

The client device 906 may be a desktop computer, laptop computer, tablet computer, personal digital assistant (PDA), in- or out-of-car navigation system, smart phone or other cellular or mobile phone, or mobile gaming device, other mobile device, or other suitable computing devices. Client device 906 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over a network 904.

Network 904 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 906 may access the social-networking system 902.

While these methods, systems, and user interfaces utilize both publicly available information as well as information provided by users of the social-networking system, all use of such information is to be explicitly subject to all privacy settings of the involved users and the privacy policy of the social-networking system as a whole.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:
1. A method comprising:
providing, for display by a user computing device, a listing of communication thread summaries for a plurality of communication threads between a user of the user computing device and one or more co-users, each communication thread summary comprising a message excerpt from a most recent message from a corresponding communication thread;
causing the user computing device to display, within the listing of communication thread summaries, one or more read status notifications for one or more communication threads;
monitoring interactions with a communication thread from the plurality of communication threads by each communication thread participant to determine that each communication thread participant has accessed a most recent message of the communication thread; and
in response to determining that each communication thread participant has accessed a most recent message of the communication thread, causing the user computing device to update a read status notification in the communication thread summary for the communication thread to indicate that each participant of the communication thread has accessed the most recent message of the communication thread.

2. The method as recited in claim 1, wherein each communication thread summary further comprises one or more participant indicators, and a communication thread title.

3. The method as recited in claim 2, further comprising, in response to determining that each communication thread participant has accessed the most recent message of the communication thread, causing the user computing device to update the message excerpt of the communication thread summary associated with the communication thread to indicate one or more portions of the most recent message of the communication thread.

4. The method as recited in claim 1, wherein causing the user computing device to display one or more read status notifications comprises, for each of the one or more communication threads, providing a read status notification as part of the corresponding communication thread summary that notifies the user of a latest message accessed in the communication thread by any communication thread participant.

5. The method as recited in claim 1, wherein each of the one or more read status notifications comprises at least one of an icon, one or more words, one or more participant indicators, or a date associated with a most recent access by any participant of the corresponding communication thread.

6. The method as recited in claim 1, wherein monitoring interactions with the communication thread from the plurality of communication threads by each communication thread participant to determine that each communication thread participant has accessed the most recent message of the communication thread comprises receiving a date and time from at least one user computing device associated with each participant of the communication thread associated with accessing the most recent message of the communication thread.

7. The method as recited in claim 1, wherein causing the user computing device to update the read status notification for the communication thread to indicate that each participant of the communication thread has accessed the most recent message of the communication thread comprises updating the read status notification to a check-mark icon.

8. A non-transitory computer-readable medium storing instructions thereon that, when executed by at least one processor, cause a computer system to:
provide, for display by a user computing device, a listing of communication thread summaries for a plurality of communication threads between a user of the user computing device and one or more co-users, each communication thread summary comprising a message excerpt from a most recent message from a corresponding communication thread;
cause the user computing device to display, within the listing of communication thread summaries, one or more read status notifications for one or more communication threads;
monitor interactions with a communication thread from the plurality of communication threads by each communication thread participant to determine that each communication thread participant has accessed a most recent message of the communication thread; and
in response to determining that each communication thread participant has accessed a most recent message of the communication thread, cause the user computing device to update a read status notification in the communication thread summary for the communication thread to indicate that each participant of the communication thread has accessed the most recent message of the communication thread.

9. The non-transitory computer-readable medium as recited in claim 8, wherein each communication thread summary further comprises one or more participant indicators and a communication thread title.

10. The non-transitory computer-readable medium as recited in claim 9, further storing instructions thereon that, when executed by at least one processor, cause a computer system to, in response to determining that each communication thread participant has accessed the most recent message of the communication thread, cause the user computing device to update the message excerpt of the communication thread summary associated with the communication thread to indicate one or more portions of the most recent message of the communication thread.

11. The non-transitory computer-readable medium as recited in claim 8, wherein causing the user computing device to display one or more read status notifications comprises, for each of the one or more communication threads, providing a read status notification as part of the corresponding communication thread summary that notifies the user of a latest message accessed in the communication thread by any communication thread participant.

12. The non-transitory computer-readable medium as recited in claim 8, wherein each of the one or more read status notifications comprises at least one of an icon, one or more words, one or more participant indicators, or a date associated with a most recent access by any participant of the corresponding communication thread.

13. The non-transitory computer-readable medium as recited in claim 8, further storing instructions thereon that, when executed by at least one processor, cause a computer system to monitor interactions with the communication thread from the plurality of communication threads by each communication thread participant to determine that each communication thread participant has accessed the most recent message of the communication thread by receiving a date and time from at least one user computing device associated with each participant of the communication thread associated with accessing the most recent message of the communication thread.

14. The non-transitory computer-readable medium as recited in claim 8, wherein causing the user computing device to update the read status notification for the communication thread to indicate that each participant of the communication thread has accessed the most recent message of the communication thread comprises updating the read status notification to a check-mark icon.

15. A system comprising:
at least one processor; and
at least one non-transitory computer-readable storage medium storing instructions thereon that, when executed by the at least one processor, cause the system to:
provide, for display by a user computing device, a listing of communication thread summaries for a plurality of communication threads between a user of the user computing device and one or more co-users, each communication thread summary comprising a message excerpt from a most recent message from a corresponding communication thread;
cause the user computing device to display, within the listing of communication thread summaries, one or more read status notifications for one or more communication threads;

monitor interactions with of a communication thread from the plurality of communication threads by each communication thread participant to determine that each communication thread participant has accessed a most recent message of the communication thread; and in response to determining that each communication thread participant has accessed a most recent message of the communication thread, cause the user computing device to update a read status notification in the communication thread summary for the communication thread to indicate that each participant of the communication thread has accessed the most recent message of the communication thread.

16. The system as recited in claim 15, wherein each communication thread summary further comprises one or more participant indicators, and a communication thread title.

17. The system as recited in claim 16, wherein causing the user computing device to display one or more read status notifications comprises, for each of the one or more communication threads, providing a read status notification as part of the corresponding communication thread summary that notifies the user of a latest message accessed in the communication thread by any communication thread participant.

18. The system as recited in claim 17, wherein each of the one or more status notifications comprises at least one of an icon, one or more words, one or more participant indicators, or a date associated with a most recent access by any participant of the corresponding communication thread.

19. The system as recited in claim 18, storing instructions thereon that, when executed by the at least one processor, cause the system to monitor interactions with the communication thread from the plurality of communication threads by each communication thread participant to determine that each communication thread participant has accessed the most recent message of the communication thread by receiving a date and time from at least one user computing device associated with each participant of the communication thread associated with accessing the most recent message of the communication thread.

20. The system as recited in claim 19, wherein causing the user computing device to update the read status notification for the communication thread to indicate that each participant of the communication thread has accessed the most recent message of the communication thread comprises updating the read status notification to a check-mark icon.

* * * * *